US011928339B2

(12) United States Patent
Ruelle et al.

(10) Patent No.: US 11,928,339 B2
(45) Date of Patent: Mar. 12, 2024

(54) METHOD, SYSTEM, AND CIRCUIT FOR MEMORY PROTECTION UNIT CONFIGURATION AND CONTENT GENERATION

(71) Applicant: STMicroelectronics (Grand Ouest) SAS, Le Mans (FR)

(72) Inventors: Frederic Ruelle, Marigné-Laillé (FR); Michel Jaouen, Yvre l'Eveque (FR)

(73) Assignee: STMicroelectronics (Grand Quest) SAS, Le Mans (FR)

( * ) Notice: Subject to any disclaimer, the term of this patent is extended or adjusted under 35 U.S.C. 154(b) by 10 days.

(21) Appl. No.: 17/825,975

(22) Filed: May 26, 2022

(65) Prior Publication Data
US 2023/0384950 A1    Nov. 30, 2023

(51) Int. Cl.
*G06F 3/06* (2006.01)
(52) U.S. Cl.
CPC ............ *G06F 3/062* (2013.01); *G06F 3/0604* (2013.01); *G06F 3/064* (2013.01); *G06F 3/0679* (2013.01)
(58) Field of Classification Search
CPC ........ G06F 3/062; G06F 3/0604; G06F 3/064; G06F 3/0679
USPC ........................................................ 711/163
See application file for complete search history.

(56) References Cited

U.S. PATENT DOCUMENTS

| 7,068,545 | B1 | 6/2006 | Kimelman et al. |
| 8,572,329 | B2 | 10/2013 | Axford et al. |
| 11,132,305 | B1 | 9/2021 | Moore |
| 2007/0180186 | A1* | 8/2007 | Cornwell .............. G06F 12/023 711/170 |
| 2011/0078760 | A1 | 3/2011 | De Perthuis |
| 2018/0314441 | A1* | 11/2018 | Suryanarayana ..... G06F 3/0683 |
| 2021/0191647 | A1* | 6/2021 | Muthiah ............... G06F 3/0679 |

OTHER PUBLICATIONS

ReinhardKeil, "Project Requirements we should consider #6," Open-CMSIS-Pack /Open-CMSIS-PACK-Spec, GitHub, Issue #6, opened Jul. 2, 2021, URL=https://github.com/Open-CMSIS-Pack/Open-CMSIS-Pack-Spec/issues/6, download date Jun. 3, 2022. (6 pages).
"Atmel AT02346: Using the MPU on Atmel Cortex-M3 / Cortex-M4 based Microcontrollers," Atmel Application Note, 2013, 20 pages.

* cited by examiner

*Primary Examiner* — Hashem Farrokh
(74) *Attorney, Agent, or Firm* — Seed IP Law Group LLP

(57) ABSTRACT

System, method, and circuitry for generating content for a programmable computing device based on user-selected memory regions. Contiguous regions that share memory access attributes are merged, interleaved contiguous regions that share at least one nested attribute are defined into combined regions, and remaining regions are defined as separate independent regions. A memory protection unit (MPU) region size closest to a size of each defined region is identified. If the start address of each region aligns with the address structure of the MPU region size, then those regions are assigned to MPU regions having the MPU region size; otherwise, another MPU size that aligns with the size of the regions is selected and those regions are assigned to MPU regions having that size. Content is generated to configure settings of MPU regions of the programmable computing device for the merged contiguous regions, the combined region, and the independent regions.

23 Claims, 15 Drawing Sheets

```
{
    "blocks" : {
        "configs":{
            "label" : "Configuration",
            "fields" : {
                "label": {
                    "label" : "Name",
                    "type": "string",
                    "minLength": 3,
                    "maxLength": 8,
                    "help_text": "name of the configuration",
                    "default": "none"
                },
                "frequency":{
                    "label":"Frequency",
                    "type": "number",
                    "minimum": 0,
                    "maximum": { "expr": "getGlobal().bus_clock" },
                    "unit": "Hz",
                    "description": "Specifies frequency used to compute the period value to be loaded into the active Auto-Reload Register at the next update event.",
                    "help_text": "In the header file : ARR = (TIM1 counter clock / TIM1 output clock)-1"
                },
                "DCH1":{
                    "label":"DutyCycleCH1",
                    "type": "number",
                    "minimum": 0,
                    "maximum": 100,
                    "unit": "%",
                    "description": "Specifies the duty cycle for channel 1 of the timer.",
                    "help_text": "The tool converts it into a pulse value, pulse value = period * duty cycle / 100"
                },
                "DCH2":{
                    "label" : "DutyCycleCH2",
                    "type": "number",
                    "minimum": 0,
                    "maximum": 100,
                    "unit": "%",
                    "description": "Specifies the duty cycle for channel 2 of the timer.",
                    "help_text": "The tool converts it into a pulse value, pulse value = period * duty cycle / 100"
                }
            }
        }
    }
}
```

*FIG. 5*

```json
{
    "id" : "::Device:Application:HAL Examples",
    "resources": {
        "pwm_led_dimmer": {
            "resource_query": {
                "type": "driver(hal,tim)"
            },
            "description": "Timer instance",
            "help_text": "choose Timer instance",
            "source": "Parameters from Figure 5.json"
        }
    },
    "overlay": {
        "pwm_led_dimmer": {
            "id" : "::Device:EXAMPLE_PROCESSOR HAL Code Gen:TIM Init",
            "resource_query": {
                "criteria": [
                    "advanced = true",
                    "prescaler > 10",
                    "COUNT_CHANNEL_WITH('pwm')=4"
                ],
                "default": "TIM4"
            },
            "blocks": {
                "configs": {
                    "fields": {
                        "[Period]": "(self.resources.pwm_led_dimmer.resource.%counter_clock% / self.resources.pwm_led_dimmer.blocks.configs.%current_config%.fields.frequency)-1",
                        "ConfigOC": {
                            "CH1": {
                                "[Pulse]": "(self.resources.pwm_led_dimmer.blocks.configs.%current_config%.fields.DCH1 * %this%.Period) / 100"
                            },
                            "CH2": {
                                "[Pulse]": "(self.resources.pwm_led_dimmer.blocks.configs.%current_config%.fields.DCH2 * %this%.Period) / 100"
                            }
                        }
                    }
                }
            }
        }
    }
}
```

*FIG. 6*

METHOD, SYSTEM, AND CIRCUIT FOR MEMORY PROTECTION UNIT CONFIGURATION AND CONTENT GENERATION

BACKGROUND

Technical Field

The present disclosure generally relates to electronic devices of the type often used in embedded applications. More particularly, but not exclusively, the present disclosure relates to generating content for use in programming such electronic devices.

Description of the Related Art

Many programmable microcontroller and microprocessor architectures utilize specific code to initialize or configure operation of the microcontroller and microprocessor in a manner desired by the user. This code can establish a desired clock setup, assign peripherals, embed software that is to execute on the microcontroller or microprocessor, establish memory protections and configurations, and prepare other software or hardware configuration settings. To generate such code, a user would have to be trained on the specific code or hardware nuances of the microcontroller or microprocessor, which can vary from one architecture to another. Some architectures include a graphical tool that enables the user to visualize the configuration settings. These tools, however, are often rigid and do not provide the user with a great deal of flexibility in generating the code. It is with respect to these and other considerations that the embodiments described herein have been made.

BRIEF SUMMARY

Embodiments described herein utilize a graphical user interface to enable a user to select user-defined memory regions for a programmable computing device such that content (e.g., code, settings, parameters, option bits or bytes, EEPROM data, etc.) is generated for the programmable computing device to set parameters and define memory protection unit (also referred to as MPU) regions for the user-defined memory regions. A set of user-defined regions of the memory in which to store data on the programmable computing device is received. Contiguous regions that share memory access attributes are merged, interleaved contiguous regions that share at least one nested attribute are defined as a combined region, including at least one priority region to handle nested regions in the combined region, and contiguous regions that fail to share memory access attributes or at least one nested attribute with at least one interleaved region are defined as separate independent regions. Content to configure settings of a memory protection unit for the merged contiguous regions, the combined region, and the independent regions is generated. The content is provided to the programmable computing device. Embodiments described herein can be used to lower the number of memory protection unit regions required in the programmable computing device because this resource is usually critical in programmable computing devices, (typically only eight regions are configurable in the memory protection unit).

In some embodiments, a region from the contiguous regions, the combined region, and the independent regions is selected. A memory protection unit region size closest to a size of the selected region is identified. If the start address of the selected region aligns with the address structure of the memory protection unit region size, then the selected region is assigned to a memory protection unit region having the memory protection unit region size. If the start address of the selected region does not align with the address structure of the first memory protection unit region size, then a second memory protection unit size is selected that aligns with the size of the selected region and the selected region is assigned to a memory protection unit region having the second memory protection unit region size. If the size of the selected region is larger than the memory protection unit region size, then a remainder of the selected region is assigned to a second memory protection unit region. In various scenarios, this processing is to apply the programming constraints of an ARM-v6M or v7M MPU. For example, an ARM-v8M MPU does not have the same constraints as the ARM-v6M or v7M MPU. This processing can be used to fulfilling the programming constraints of the MPU depending on the selected programmable computing device.

In various embodiments, a second memory protection unit region size that is larger than the first memory protection unit region size is selected and a memory protection unit region is selected based on the second, larger memory protection unit region size. A plurality of sub-regions are identified for the selected memory protection unit region, and the selected region is assigned to a first portion of the plurality of sub-regions and a second portion of the plurality of sub-regions are disabled. The use of sub-regions can allow for a finer split of the original larger region with finer alignment rules for each sub-region. In various other embodiments, a second memory protection unit region size that is smaller than the first memory protection unit region size is selected. A first memory protection unit region is selected based on the second memory protection unit region size and a first portion of the selected region is assigned to the first memory protection unit region. A second memory protection unit region is then selected based on a remainder size of the selected region and a second portion of the selected region is assigned to the second memory protection unit region.

A plurality of memory protection unit region configurations having different region sizes or numbers may be ranked and a memory protection unit region configuration is selected from the plurality of memory protection unit region configurations based on the ranking. In some embodiments, the user may provide a parameter to indicate if lowering the number of MPU regions in use has priority or if using the exact match of user-defined MPU boundaries is prioritized.

Embodiments described herein result in configurable content being generated for a programmable computing device based on a user's selections without the user having to specifically write the content.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views, unless the context indicates otherwise. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings.

One or more embodiments are described hereinafter with reference to the accompanying drawings in which:

FIG. 5 is an illustrative example of a component parameters file in accordance with embodiments described herein;

FIG. 6 is an illustrative example of a component template file that obtains values from the parameters file in accordance with embodiments described herein;

DETAILED DESCRIPTION

In the following description, along with the accompanying drawings, certain details are set forth in order to provide a thorough understanding of various embodiments of devices, systems, methods, and articles. One of skill in the art, however, will understand that other embodiments may be practiced without these details. In other instances, well-known structures and methods associated with, for example, circuits, such as transistors, multipliers, adders, dividers, comparators, integrated circuits, logic gates, finite state machines, accelerometers, gyroscopes, magnetic field sensors, memories, bus systems, etc., have not been shown or described in in detail in some figures to avoid unnecessarily obscuring descriptions of the embodiments. Moreover, well-known structures or components that are associated with the environment of the present disclosure, including but not limited to the communication systems and networks, have not been shown or described in order to avoid unnecessarily obscuring descriptions of the embodiments.

Unless the context requires otherwise, throughout the specification and claims that follow, the word "comprise" and variations thereof, such as "comprising," and "comprises," are to be construed in an open, inclusive sense, that is, as "including, but not limited to."

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references. Furthermore, the particular features, structures, or characteristics may be combined in any suitable manner in one or more embodiments to obtain further embodiments.

Figure 1:
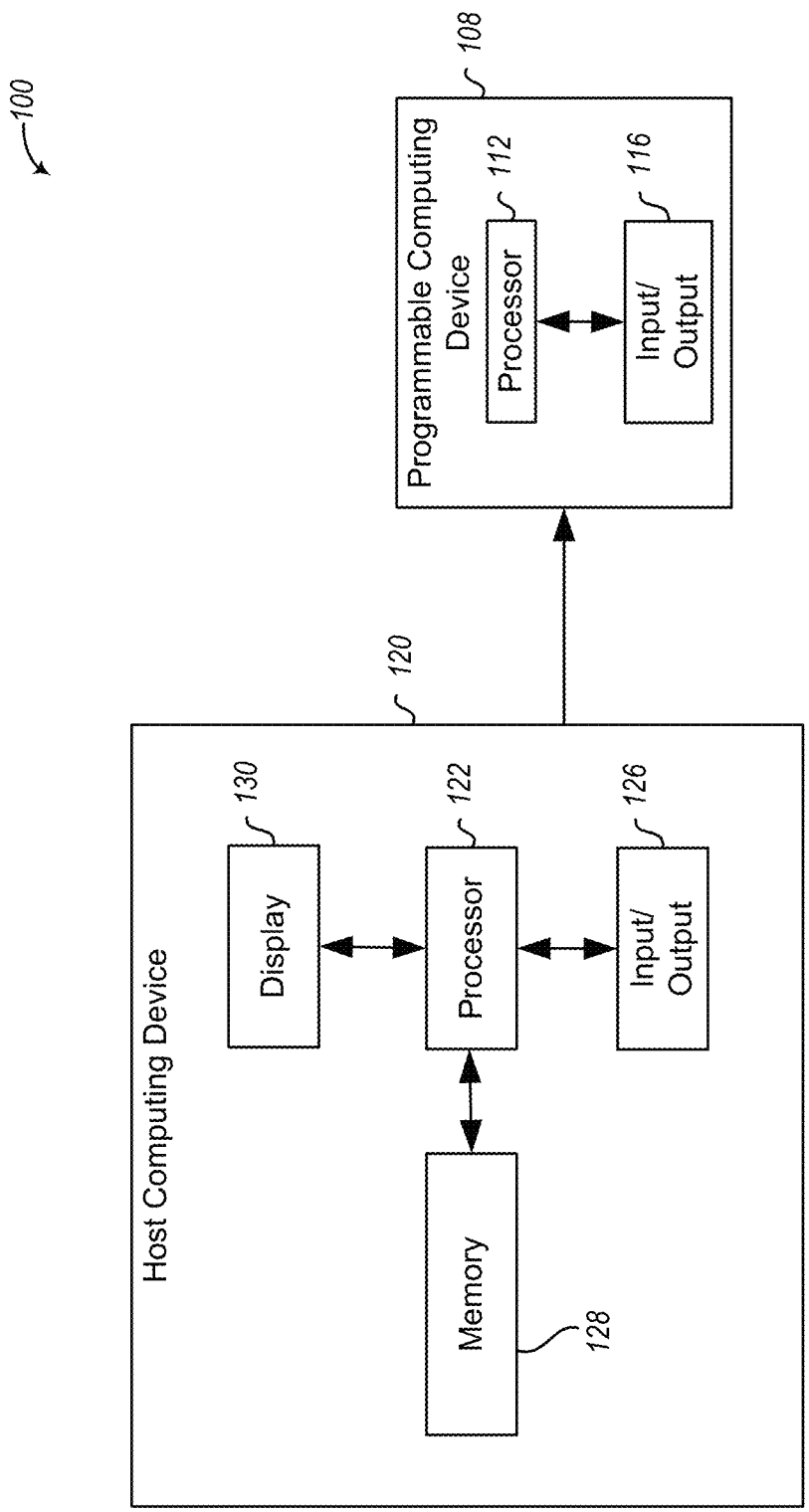
FIG. 1 is a block diagram showing an example computing environment for implementing embodiments described herein.

FIG. 1 is a block diagram showing an example computing environment 100 for implementing embodiments described herein. Environment 100 includes a programmable computing device 108 and a host computing device 120.

The programmable computing device 108 has a processor 112 and input/output peripherals 116. Although not illustrated, computing device 108 may have other computing components, such as one or more memories, graphics processing units, wireless network modules, analog-to-digital converters, microelectromechanical systems, other sensors, etc.

The programmable computing device 108 may be a microprocessor, microcontroller, or other computer device that is or contains an integrated circuit having a programmable interface. The processor 112 includes one or more central processing units or processor cores that have or utilize a Memory Protection Unit (MPU). The memory protection unit is dedicated to memory segregation and enforcement of access rules to different regions of the memory. Examples of processor 112 may be an ARM-Cortex-M4 with an MPU unit, ARM-Cortex-M0, or other architecture. In some embodiments, the processor 112 may include a state machine, a microprocessor, a programmable logic circuit, discrete circuitry, logic gates, registers, etc. The processor 112 may control overall operation of the programmable computing device 108, execution of applications programs by the programmable computing device 108, etc.

The programmable computing device 108 also includes one or more memories (not shown), such as one or more volatile or non-volatile memories, or a combination thereof, which may store, for example, all or part of instructions and data related to applications and operations performed by the programmable computing device 108. For example, the memory may store computer instructions that when executed by the processor 112, cause the programmable computing device 108 to perform a desired function. The memory may also store information that is used to configure the hardware of the programmable computing device 108

The input/output peripherals 116 may include one or more general purpose input/output pins, dedicated input or output interfaces (e.g., serial input/output ports), wireless interfaces, etc. In some embodiments, input/output peripherals 116 may be configured to receive input data from other computing devices or may be configured to provide output data to other computing devices.

The programmable computing device 108 may also include a bus system (not illustrated), which may be configured such that the processor 112, input/output peripherals 116, memories, or other circuits or circuitry (not illustrated) are communicatively coupled to one another to send or receive, or send and receive, data to or from other components. The bus system may include one or more of data, address, power, or control busses, or some combination thereof, electrically coupled to the various components of the programmable computing device 108.

The host computing device 120 includes a processor 122, an input/output interface 126, and a memory 128. The host computing device 120 is configured to employ embodiments described herein to present a graphical user interface to a user, to enable the user to select and customize components, and to generate content from those components for programming the software or hardware, or both, of the programmable computing device 108.

Processor 122 may include one or more processors that are configured to execute computer instructions to employ embodiments described herein.

Memory 128 may include one or more various types of non-volatile and/or volatile storage technologies. Examples of memory 128 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 128 may be utilized to store information, including computer-readable instructions that are utilized by processor 122 to perform actions, including embodiments described herein. Memory 128 may also store other information, which is discussed in more detail below in conjunction with FIG. 2.

Input/output interface 126 may include one or more other data input or output interfaces. For example, the input/output interface 126 may include or provide data to a display device 130, which can be used to present the graphical user interface to the user. The input/output interface 126 can accept input from the user to select and customize components, as described herein. In various embodiments, input/output interface 126 can accept input from the user to select user-defined memory regions, as described herein. Moreover, the input/output interface 126 is configured to provide content generated as described herein to the programmable computing device 108.

Figure 2:
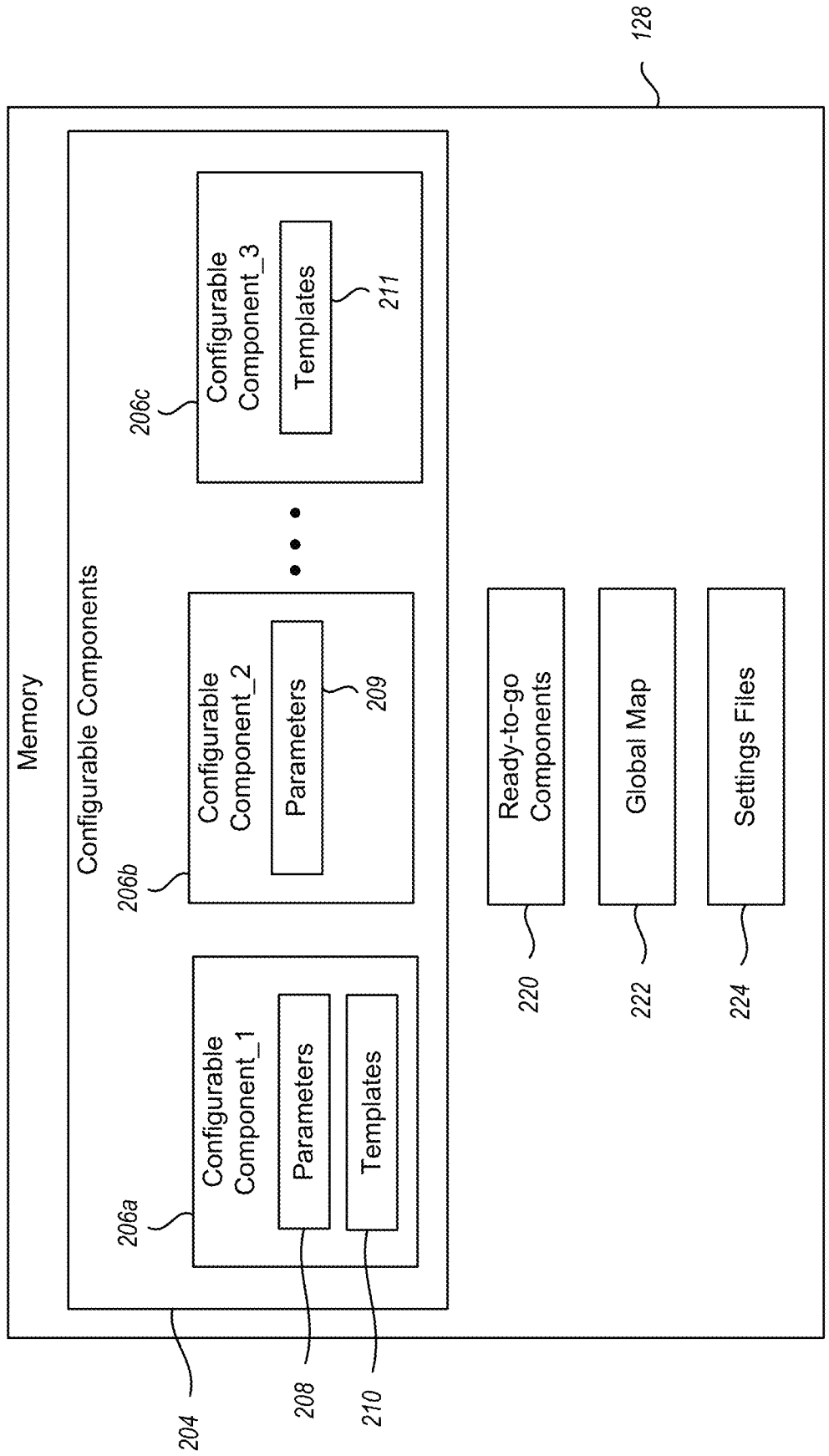
FIG. 2 is a block diagram showing an example conceptual structure for storing aspects utilized in generating content in accordance with embodiments described herein.

FIG. 2 is a block diagram showing an example conceptual structure of a memory 128 for storing aspects utilized in generating content in accordance with embodiments described herein. The memory 128 may be the memory 128 of the host computing device 120 from FIG. 1.

The memory 128 may store configurable components 204, ready-to-go components 220, a global map 22, and settings files 224. Although not shown, memory 128 may also store computer instructions that are executable by a processor (e.g., processor 122 in FIG. 1) to perform embodiments described herein. The data stored in the memory 128 may utilize standard syntax, e.g., JSON schema, which can enable the use of standard libraries in that syntax, e.g., JSON forms. Configurable components 204 include at least one configurable component 206a-206c. The configurable components 206a-206c include or describe some configuration, control, implementation, or functionality associated with software or hardware aspects of a programmable computing device, such as programmable computing device 108 in FIG. 1. These configurable components 206a-206c have one or more constraints or variables that can be defined, selected, or set by the user.

Configurable components 206a-206c may include parameters files, template files, or both. For example, configurable component 206a includes parameters 208 and templates 210, configurable component 206b includes parameters 209, and configurable component 206c includes templates 211.

Parameters 208 and 209 may include one or more files that store parameters or variables of the configurable component that can be selected or set by the user. The parameters 208 and 209 may store the possible values the user can select for one or more parameters. These values can be direct values, advanced expressions, or queries to databases (not illustrated). The parameters 208 and 209 may be used to configure or implement one or more software or hardware aspects associated with the programmable computing device. In various embodiments, one or more generic or customized grammar structures may be utilized to write or generate the parameters 208 and 209. This grammar is a set of rules indicating how to express the configurability of a component or template.

In various embodiments, one or more parameters of the parameters 208 and 209 may be defined by another parameter, component, or template. Accordingly, one or more parameters can be dependent on one or more other parameters, components, or templates, which can create various dependencies among parameters.

Templates 210 and 211 may include one or more files that store previously generated templates for the user to select or set. The templates 210 and 211 are configuration tools for the programmable computing device. The templates 210 and 211 may be files that contain instrumented code that is used to generate content to initialize, configure, or control a software or hardware aspect of the programmable computing device. In some embodiments, the templates 210 and 211 contain C code instrumented with handlebars templating language. At content generation stage, the instrumented parts are replaced by information coming from the global map 222, which is described in more detail below.

In some embodiments, one or more of the templates 210 and 211 may rely on parameters selected by the user. For example, configurable component 206a may include a single template 210, which includes four user-selectable values, which are defined in the parameters 208. In other embodiments, the templates may be selected or linked to one another by the user. In at least one embodiment, one or more templates 210 and 211 may rely or obtain values from other templates, other components, or other software or hardware projects that are to be implemented on the programmable computing device.

The ready-to-go components 220 are previously designed components that configure or pilot one or more software or hardware aspects of the programmable computing device. In at least one embodiment, the ready-to-go components 220 may also be referred to as non-configurable components. In various embodiments, the ready-to-go components 220 do not include any user-selectable features. Rather, the ready-to-go components 220 are fully operational and can configure or implement one or more software or hardware aspects of the programmable computing device without further input or selections by the user. As discussed in more detail below, the user may be presented with a graphical user interface in which the user can select to add or remove ready-to-go components from the project.

The settings files 224 store the results of the user selected configurable components, parameters, and templates. For example, a specific settings file in settings file 224 may define a configurable component 206*a* that is selected by the user. The specific settings file may also identify one or more templates from the templates 210 that were selected by the user, along with the values of the parameters 208 that were selected by the user. In some embodiments, the settings files 224 may also store optional user settings for software or hardware aspects of the programmable computing device. In some embodiments, a single settings file 224 is generated for each selected configurable component 204. In other embodiments, multiple settings files 224 are generated for a single selected configurable component 204. In yet other embodiments, a single settings file 224 may be generated for multiple selected configuration components 204. Moreover, multiple settings files 224 can be generated for multiple selected configuration components 204. In some embodiments, these settings files 224 may be stored as settings.json files.

In various embodiments, the settings files 224 may also store settings or parameters of the memory protection unit regions generated for the user-defined regions, as described in conjunction with FIGS. 9-12.

The global map 222 is an in-memory object centralizing all the user selections and settings that are generated via the user's selection of configurable components 204, parameters, and templates. In some embodiments, the global map 222 may centralize all the user selections and settings that are generated via the user's selection regarding memory regions. Moreover, the global map 222 is a software component providing a dictionary, getters/setters, or services to compute or re-compute content for a programmable computing device based on expressions or dependencies. Overall, the global map 222 is a dictionary or database memorizing all of the software components settings and hardware platform settings of the programmable computing device. In some embodiments, separate global maps may be generated for software and hardware aspects of the programmable computing device.

As described herein, the global map 222 is a module implementing a set of services to retrieve, store, compute, re-compute, or resolve values selected by the user. In various embodiments, the global map 222 may be a JSON object with a set of accessors (API) to the components, templates, and values selected by the user. In some embodiments, the global map 222 may be a concatenation of all the settings files 224. In other embodiments, the global map 222 may be updated directly from the user's selections without using or accessing the settings files 224. In some other embodiments, the global map 222 includes or is associated with services in addition to the JSON objects.

As discussed in more detail below, the host computing device, such as host computing device 120 in FIG. 1, utilizes the global map 222, along with the selected configurable components 204 and any selected ready-to-go components 220, to generate content that is provided to and used by the programmable computing device to implement, control, or configure one or more software aspects of the programmable computing device, one or more hardware aspects programmable computing device, or both.

The operation of one or more embodiments will now be described with respect to FIGS. 3 and 4, and for convenience will be described with respect to the embodiments of FIGS. 1 and 2 described above. In at least one of various embodiments, processes 300 and 400 described in conjunction with FIGS. 3 and 4, respectively, may be implemented by or executed on one or more computing devices, such as host computing device 120 in FIG. 1.

Figure 3:
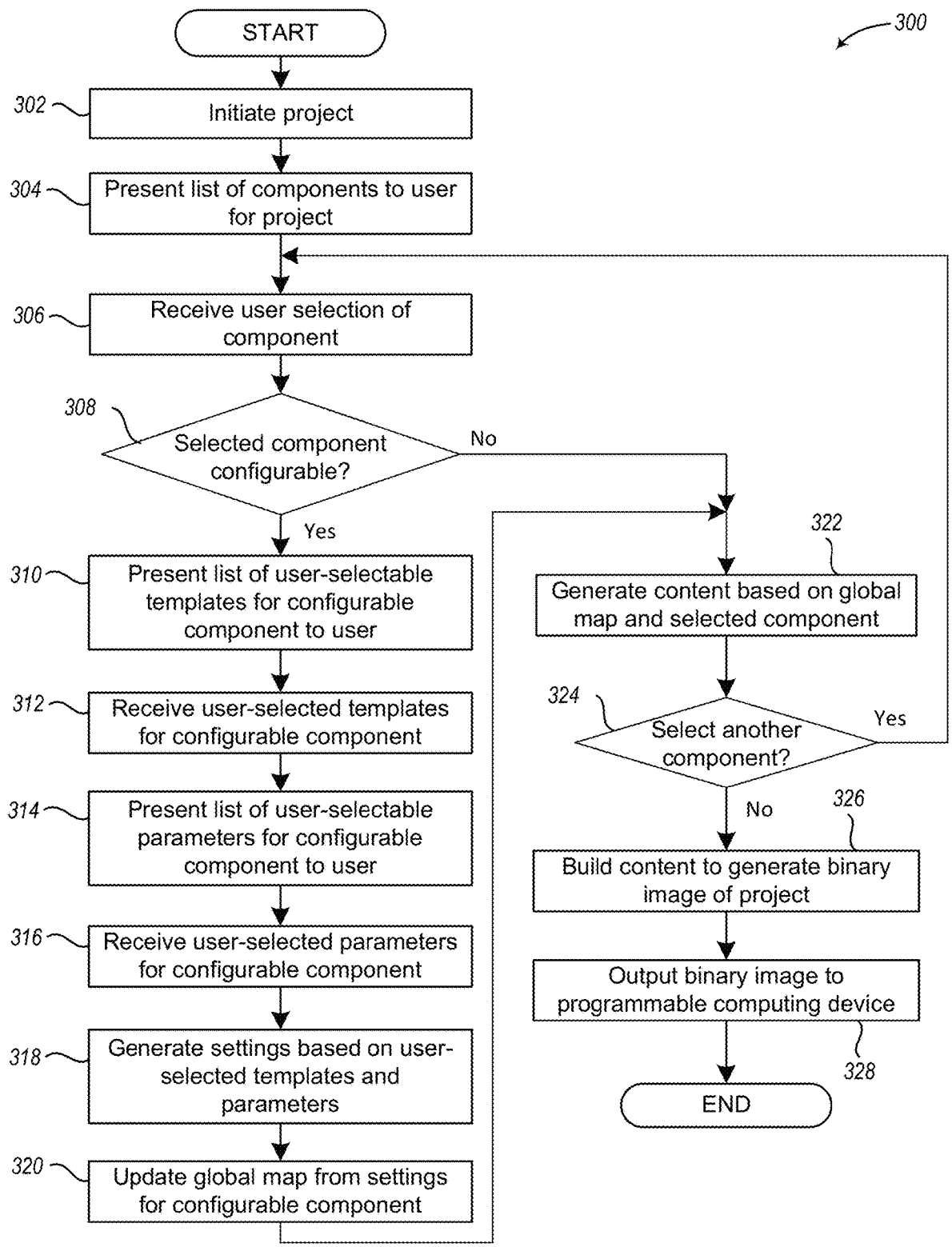
FIG. 3 shows a logical flow diagram of a process for generating content in accordance with embodiments described herein.

FIG. 3 shows a logical flow diagram of a process 300 for generating content in accordance with embodiments described herein.

Process 300 begins, after a start block, at block 302, where a project is initiated for generating content to implement on or configure a programmable computing device, such as programmable computing device 108 in FIG. 1. In some embodiments, the project initiation includes presenting a graphical user interface to a user. The graphical user interface requests or includes an input interface for the user to select a particular programmable computing device. A global map for the project is also initiated. The global map may include a predefined structure or initial settings for the particular programmable computing device.

In some embodiments, a single project for software and hardware is initiated for the programmable computing device. As such, a single global map may be generated. In other embodiments, a first project may be initiated for software of the programmable computing device and a second project may be initiated for hardware of the programmable computing device. Separate global maps may then be generated for the separate projects. In at least one such embodiment, process 300 may be executed sequentially or in parallel for the separate software and hardware projects. In other embodiments, process 300 may be executed for concurrent processing of both the software and hardware projects.

Process 300 proceeds to block 304, where a list of a plurality of components for the project are presented to the user in the graphical user interface. In at least one embodiment, the list of components may be generated for the user based on the particular programmable computing device selected for the project. These components may be those components that are designed for or compatible with the programmable computing device. In some embodiments, the list of components may also be selected for presentation based on the execution context specificities of the programmable computing device. In some architectures, an execution context for a particular processing core or a particular mode of operation (e.g., TrustZone mode) may be selected by the user. The list of components presented to the user can be dependent on these user selections. The list of components may include configurable components, such as configurable components 204 in FIG. 2; or non-configurable components, such as ready-to-go components 220 in FIG. 2; or some combination thereof.

Process 300 continues at block 306, where a user selection of a component is received. In at least one embodiment, a user may select a component from the list via the graphical user interface. Although process 300 discusses a user's selection of a single component at a time, embodiments are not so limited. In some embodiments, a plurality of components may be selected by a user.

Process 300 proceeds next to decision block 308, where a determination is made whether the selected component is a configurable component or a non-configurable component. In some embodiments, the components may have a tag or other identifier indicating whether the component is configurable by the user or not. In other embodiments, a database or other data structure of configurable and non-configurable components may be maintained and compared against the selected component. If the selected component is configurable, then process 300 flows to block 310; otherwise, process 308 flows to block 322.

As mentioned above, a plurality of components may be selected by a user; if so, process 300 flows to block 310 for any selected configurable components and block 322 for any select non-configurable components. In various embodiments, the user may be enabled to configure each selected component individually or in parallel via the graphical user interface.

At block 310, a list of one or more user-selectable templates for the user-selected configurable component is presented to the user via the graphical user interface. In some embodiments, the list of user-selectable templates may include one or more characteristics of the template that may be set or selected by the user, such as if the template links to another template, component, or project.

The list of user-selectable templates can be customized or defined to utilize user-desired user interface elements. Accordingly, the user interface can be customized for the different user-selectable templates such that the user can select, define, or set one or more characteristics of the templates. In some embodiments, this customization can allow the templates to use data from databases instead of listing all possible values. In other embodiments, this customization can specify the user-selectable aspects of the templates.

In various embodiments, block 310 may be optional and may not be performed. For example, in some embodiments, a template may be applied by default without a user's selection.

Process 300 proceeds next to block 312, were user-selected templates are received for the configurable component. In some embodiments, the user-selected template may include other information provided by the user defining how the template is to be used.

In some embodiments, the configurable component may include user-selectable parameters, but not include user-selectable templates. In such an embodiment, blocks 310 and 312 may not be performed for those selected configurable components that do not include user-selectable templates.

Process 300 continues next to block 314, where a list of one or more user-selectable parameters for the user-selected configurable component is presented to the user via the graphical user interface. In some embodiments, the list of user-selectable parameters may include a list of the parameters and the possible values for those parameters. In other embodiments, the list may identify the parameters and include an interface to receive a user-defined value.

The list of user-selectable parameters can be customized or defined to utilize user-desired user interface elements. Accordingly, the user interface can be customized for the different user-selectable parameters such that the user can select, define, or set one or more parameters. In some embodiments, this customization can allow the parameter selections to be driven by data from databases, expressions, formulas, or dependencies from other parameters, instead of listing all possible values. In other embodiments, this customization can specify the user-selectable aspects of the parameters. In various embodiments, the list of parameters may be a default list for its corresponding component.

In some embodiments, this list of user-selectable parameters may also include other information that can help the user understand the ramifications of selecting specific parameters. For example, the graphical user interface can include links to reference manuals, diagrams, tool tips, etc., that help explain the parameters and how different user selections can impact other components or parameters.

Process 300 proceeds next to block 316, where user-selected parameters are received for the configurable component. In at least one embodiment, a value of one or more parameters is received from the user. As mentioned above, the user may select the particular value from the list of possible values for the parameter via the graphical user interface. Alternatively, the user may input the specific value of the parameter.

In some embodiments, the configurable component may include user-selectable templates, but not include user-selectable parameters. In such an embodiment, blocks 314 and 316 may not be performed for those selected configurable components that do not include user-selectable parameters.

Process 300 continues next to block 318, where one or more settings files are generated for the selected configurable component based on the user-selected parameters, user-selected templates, or some combination thereof. In some embodiments, the settings files may be a list or other data structure identifying the parameters selected by the user and the associated values selected by the user, the templates selected by the user and any customizable features of the selected templates, or other information indicating how the configurable component was customized by the user.

In various embodiments, the settings files may be updated by overlay the user-selected information for the user-selected component to override some values of that component. In some embodiments, a component can override a parameter from another component, such as when components rely on one another for computation. In other embodiments, a component can override a query from another component, such as by changing the choices the user can make associated with that component. Because some parameters can be set or defined by other templates or components, some parameter values may be propagated or overlaid based on the dependencies between parameters, templates, and components. For example, application level values may override driver level values. In this way, user selections and changes at the application level can change values or parameters at the driver level, which can then be reflected in the global map.

Process 300 proceeds to block 320, where the global map is updated based on the settings files. As mentioned above, the global map is an in-memory object centralizing all the user selections and settings that are generated via the user's selection of configurable components 204, parameters, and template. Accordingly, the parameters, templates, values, and other information selected by the user for the user-selected configurable component are added, updated, or otherwise included in the global map for the project based on the settings files. The global map may be arranged such that the user-selected values are literals that can be written directly in the hardware unit registers by the driver software of the programmable computing device. In various embodiments, the global map may also retain whatever is used to update the result of the expressions, formulas, or dependencies based on the user's selections. In this way, when a value is updated, such as changed by a user via the graphical user interface, all related values are updated accordingly.

Although FIG. 3 shows the global map being updated based on the settings files being generated from the user's selections, embodiments are not so limited. In some embodiments, the global map may be updated in real time as the user selects components, parameters, or templates. Accordingly, in some embodiments, the use of settings files may be optional. In some embodiments, an image of the user selection may be maintained in the settings.json files.

After block 320, or if, at decision block 308, the selected component is not configurable, then process 300 flows to block 322. At block 322, content for the programmable computing device is generated based on the selected component and the information stored in the global map. The global map may operate as a consolidated database of values that can be used to generate the content from the user-selected templates and user-selected components. This content may be considered plain code (e.g., C code) that is used by the programmable computing device to initialize, configure, or control a software or hardware aspect of the programmable computing device. Accordingly, the generated content may be initialization code, application code, configuration code, etc. The content may also be other settings, parameters, or other information that initializes, configures, or controls a software or hardware aspect of the programmable computing device.

In various embodiments, overlays, handlebars, or a similar templating or replacement engine are used to resolve dependencies or expressions (e.g., handlebars expressions) in the user-selected templates or in the configurable components by accessing the values stored in the global map. The result of this step produces actual code can be compiled by a compiler for use in the programmable computing device. In various embodiments, this code generation does not modify the source code of the selected components. Thus, the components can be reused in their original form for the same project or other projects without having to modify the components. In some embodiments, the system may also generate code not requiring compilation, but can be interpreted by virtual machines (e.g., micro-python, JavaScript).

As described herein, the graphical user interface allows the user to select components and values. In some embodiments, the graphical user interface may also present a content preview to the user based on the currently selected parameters. In this way, the content generation can be triggered each time a parameter is set. When all components are configured, the content may be finally generated for the programmable computing device because all values are available with their correct values (overlays applied, expressions/formulas/dependencies computed).

Process 300 proceeds next to decision block 324, where a determination is made whether the user is to select another component. If another component is selected, process 300 loops to block 306 to receive the user selection of the other component; otherwise, process 300 flows to block 326. As mentioned above, process 300 may also be performed with the user selecting multiple components, which can then be configured by the user together or individually.

At block 326, the content generated for each user-selected component is built into a binary image for the project. This binary image is the information usable by the programmable computing device to initialize, configure, or control its hardware, software, or a combination thereof. In some embodiments, all generated content is utilized to build the binary image for the project. In other embodiments, a portion, but not all of the generated content is utilized to build the binary image for the project. For example, in the case of interpreted languages, only specific content (e.g., generated code) may be uploaded in a specific memory region of the programmable computing device without regenerating the binary interpreting it.

Process 300 continues next at block 328, where the binary image is provided to the programmable computing device. In some embodiments, process 300 may be executed multiple times to generate different content for different configurations of the programmable computing device. In this way, different configurations can be provided to separate programmable computing devices (even if a same type of programmable computing device), or different configuration can be provided to a single programmable computing device to allow a user of the programmable computing device to change between the different configurations.

After block 328, process 300 terminates or otherwise returns to a calling process to perform other actions.

Figure 4:
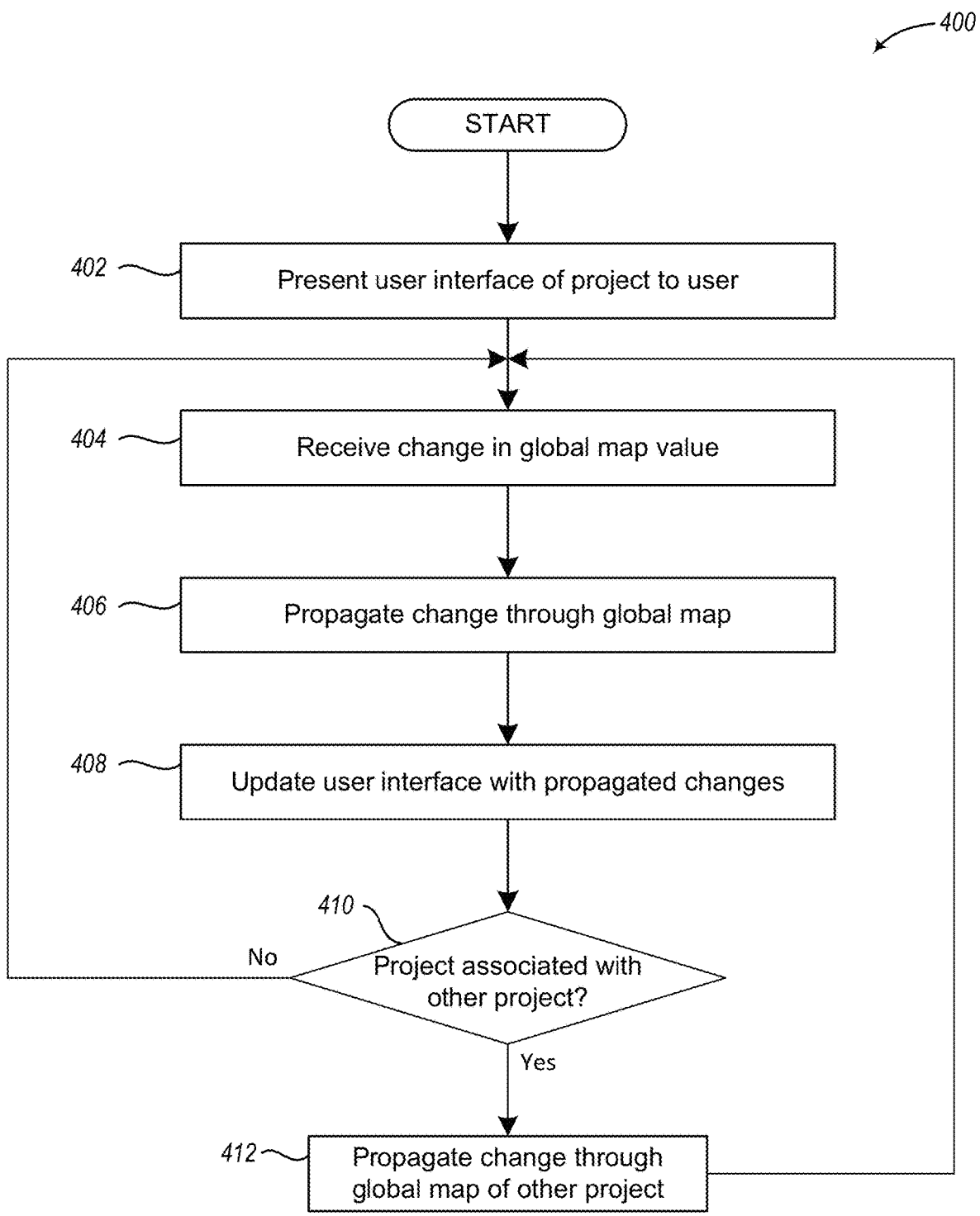
FIG. 4 shows a logical flow diagram of a process for updating a graphical user interface during the content generation process in accordance with embodiments described herein.

FIG. 4 shows a logical flow diagram of a process 400 for updating a graphical user interface during the content generation process in accordance with embodiments described herein.

Process 400 begins, after a start block, at block 402, where a user interface of a project is presented to a user. In various embodiments, this user interface is the graphical user interface displayed to the user described above. This user interface may display components that are selectable for use with a programmable computing device, parameters selectable by a user for a particular configurable component, templates selectable by the user for a particular configurable component, and other information. Moreover, the user interface may display the values of various parameters, settings, templates, and components, whether selected by a user, linked from one template to another, dependent on other values, or predefined by a template or component.

Process 400 proceeds to block 404, where a change in a global map value is received. As described above, the global map is updated in response to a user-selected configurable component, a user-selected parameter value, a user-selected template, etc. These user-selectable conditions may indicate a change in a global map value.

Process 400 continues at block 406, where the change is propagated through the global map. Because parameters, templates, and components can rely or depend on values of other parameters, templates, components, or projects, then a change in one value can result in a change in another. Thus, the received change in the global map value is propagated through the global map in accordance with these dependencies.

Process 400 proceeds next to block 408, where the user interface is updated with the propagated changes in the global map. In some embodiments, the user interface queries the global map, and any changes that occurred while updating the global map are obtained and displayed in the user interface.

Process 400 continues next at decision block 410, where a determination is made whether the project is associated with another project. If so, process 400 flows to block 412, where the change is propagated through the global map of the other project. Otherwise, process 400 loops to block 404 to receive another change to a global map value from a user.

FIG. 5 is an illustrative example of a component parameters file in accordance with embodiments described herein. In this example, the component parameters identify various different characteristics of the parameters that are selectable by a user along with the possible values. For example, the parameter "DCH1" specifies the duty cycle for a channel 1 timer that is selectable by a user. In this example, the label, such as for display to the user in the graphical user interface is "DutyCycleCH1." The type of the parameter is a number. Thus, the value selected by the user is a number. The minimum value that the user can select is zero and the maximum value the user can select is 100. Finally, the parameter indicates that the units for this parameter is a percentage.

FIG. 6 is an illustrative example of a component template file that obtains values from the parameters file in accordance with embodiments described herein. In this example, the template establishes an LED dimmer whose characteristics are obtained from the parameters shown in FIG. 5. For example, the "source" of the characteristics are obtained from "Parameters from Figure son," which is an illustrative example of depending on the parameter values in FIG. 5. The template defines the channel 1 timer as "CH1." The pulse of this timer is set as "(self.resources.pwm_led_dimmer.blocks. configs.% current_config %.fields.DCH1 * % this %.Period)/100." As noted, this definition relies on "DCH1," which is the channel 1 timer defined in the parameters. The "this" is the current "object" or current level in the JSON object. In this particular example, "this" is the "fields" stage and "this.% Period %" refers to the Period field of the current object level.

FIGS. 5 and 6 are for illustrative purposes and should not be considered as limiting. Other information, data structures, and overlay or handlebar technology may be used to establish the content for the programmable computing device from the components, templates, and parameters selected by the user in accordance with embodiments described herein.

Figure 7:
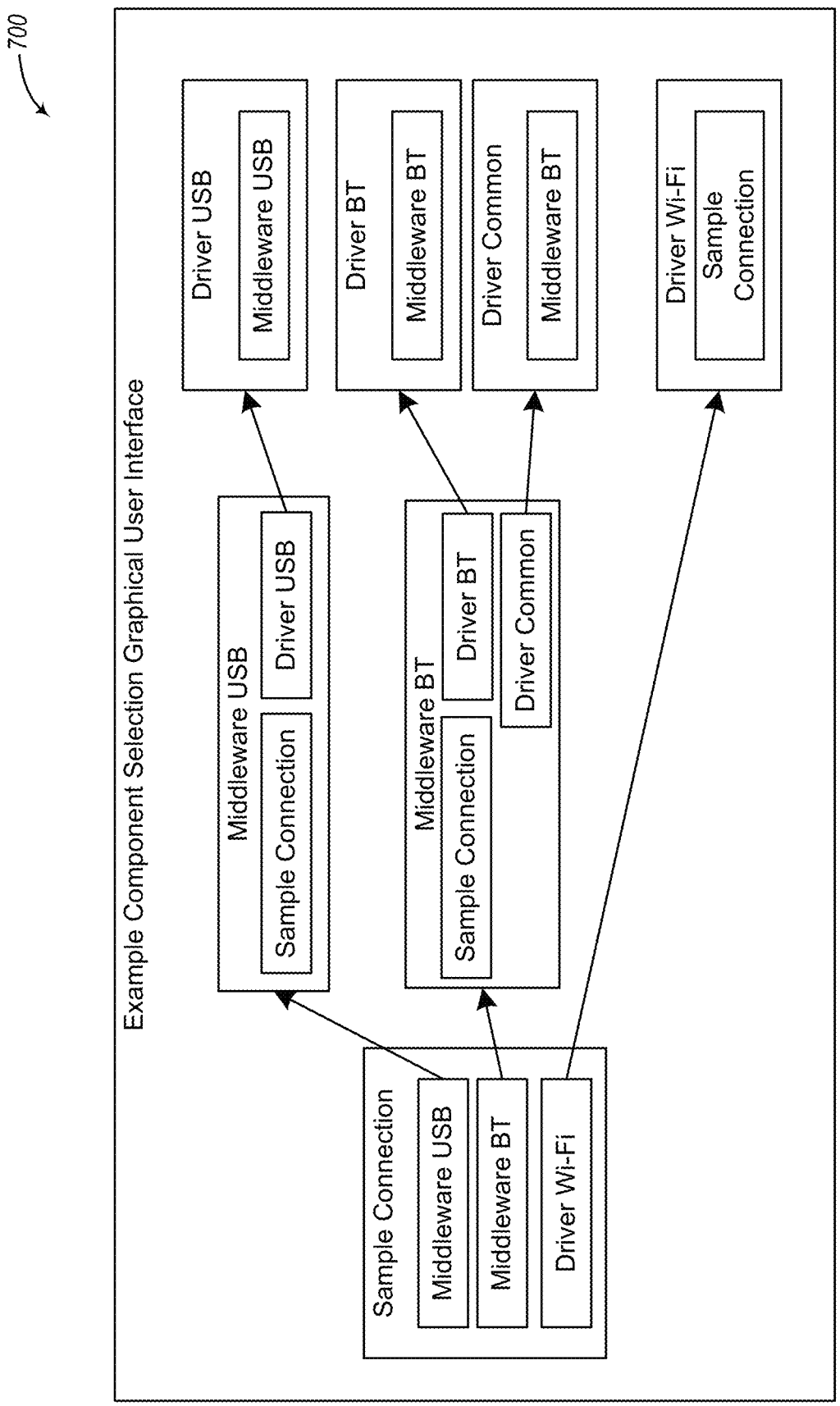
FIG. 7 is an illustrative example of a graphical user interface to enable a user to select components for a project in accordance with embodiments described herein.

FIG. 7 is an illustrative example of a graphical user interface 700 to enable a user to select components for a project in accordance with embodiments described herein. In this illustrative example, the graphical user interface 700 may display a "Sample Connection" collection of components: "Middleware USB," "Middleware BT," and "Driver Wi-Fi." In this example, Sample connection is an applicative code component having three dependencies: two middlewares components and one driver component. For this example situation, these components are required to have a complete project. In this example, the user can select which of these components to open other components for the selection. For example, the user can select the "Middleware BT," which allows the user to then select "Driver BT" or "Driver Common." This type of user interface can enable a user to progress through various different layers of components to select the appropriate components for their project. Moreover, this graphical user interface tool can help the end-user in resolving the dependencies by proposing appropriate components or by automatically selecting the component when appropriate (e.g., when only one component is filling the criteria).

Figure 8:
FIG. 8 is an illustrative example of a graphical user interface to enable a user to select parameters for a user-selected component in accordance with embodiments described herein.

FIG. 8 is an illustrative example of a graphical user interface 800 to enable a user to select parameters for a user-selected component in accordance with embodiments described herein. This graphical user interface 800 can display different configurations and possible values for multiple parameters, depending on which configurable components are selected by the user.

FIGS. 7 and 8 are for illustrative purposes and should not be considered as limiting. Other information or data may displayed to a user via the graphical user interfaces in accordance with embodiments described herein.

The operation of one or more additional embodiments will now be described with respect to FIGS. 9-12, and for convenience will be described with respect to the embodiments described above FIG. 9 shows a logical flow diagram of a process 900 for generating content to configure memory protection unit regions in accordance with embodiments described herein. In various embodiments, process 900 may be implemented by or executed on one or more computing devices, such as host computing device 120 in FIG. 1.

Process 900 begins, after a start block, at block 902, where user-defined memory partitions are received. In some embodiments, a project is initiated for generating content to implement on or configure memory protection unit (MPU) regions for a programmable computing device, such as programmable computing device 108 in FIG. 1. In some embodiments, the project initiation includes presenting a graphical user interface to a user. The graphical user interface requests or includes an input interface for the user to select a particular programmable computing device. A global map for the project is also initiated. The global map may include a predefined structure or initial settings for the particular programmable computing device. In various embodiments, block 902 may employ embodiments of block 302 in FIG. 3 to initiate one or more projects.

The graphical user interface can enable the user to select or input one or more memory partitions that are to be defined for the programmable computing device associated with the project. The graphical user interface can display different programmable computing devices from which the user can select a target programmable computing device. The graphical user interface can then display one or more available memories for the selected programmable computing device. In some embodiments, the graphical user interface can also display possible memory access attributes for each memory region. In this way, the user may be enabled to select or identify the memory access attributes of one or more user-defined partitions or regions. An example graphical user interface is shown in FIG. 12.

Process 900 proceeds to block 904, where a list of user regions is generated based on the user-defined memory partitions and the memory access attributes of each user-defined region.

Process 900 continues at block 906, where memory protection unit regions and their settings are generated based on the user regions identified in the list of user regions. In various embodiments, process 1100 described in conjunction with FIGS. 11A-11D may be utilized to generate or otherwise define the memory protection unit regions. As discussed herein, a plurality of different MPU memory region configurations may be iteratively selected and processed such that a highest ranking, or highest priority, configuration is identified for use on the programmable computing device.

Process 900 proceeds next to block 908, where content is generated based on the generated memory protection unit regions, or the highest ranking or highest priority memory protection unit region configuration. In various embodiments, the content includes code, settings, parameters, option bits or bytes, EEPROM data, etc., to set, configure, or define the MPU regions used by the programmable computing device. The content may be considered plain code (e.g., C code) that is used by the programmable computing device to initialize, configure, or control a software or hardware aspect of the programmable computing device to set the MPU regions defined by the user. Accordingly, the generated content may be initialization code, application code, configuration code, etc. The content may also be other settings, parameters, or other information that initializes, configures, or controls a software or hardware aspect of the programmable computing device. In various embodiments, the global map, as described above, may be utilized to generate the content.

In some embodiments, the content is built into a binary image for the project. This binary image is the information usable by the programmable computing device to initialize, configure, or control its hardware, software, or a combination thereof to support the MPU regions used by the programmable computing device for the project. In some embodiments, all generated content is utilized to build the binary image for the project. In other embodiments, a portion, but not all of the generated content is utilized to build the binary image for the project. For example, in the case of interpreted languages, only specific content (e.g., generated code) may be uploaded in a specific memory region of the programmable computing device without regenerating the binary interpreting it.

Process 900 proceeds to block 909, where a result or solution of the content generation is displayed to the user. For example, in various embodiments, the generated memory protection unites, parameters, settings, or other information regarding the generated content may be displayed to the user. In some embodiments, the user may be prompted to confirm the generated content solution or to request additional processing to generate another solution with other memory protection unit regions or settings. If another solution is to be generated, process 900 may loop (not illustrated) to block 902. In other embodiments, the user may be provided with a list of solutions of different generated memory protection unit regions and settings, from which the user can select a preferred solution.

Process 900 continues next at block 910, where the content is provided to the programmable computing device. In various embodiments, the content is used by the programmable computing device to generate or define the MPU regions that are to be used by the project selected by the user. In some embodiments, process 900 may be executed multiple times to generate different content for different MPU region configurations of the programmable computing device. In this way, different MPU region configurations can be provided to separate programmable computing devices (even if a same type of programmable computing device), or different MPU region configurations can be provided to a single programmable computing device to allow a user of the programmable computing device to change between the different configurations.

After block 910, process 900 terminates or otherwise returns to a calling process to perform other actions.

Figure 10:
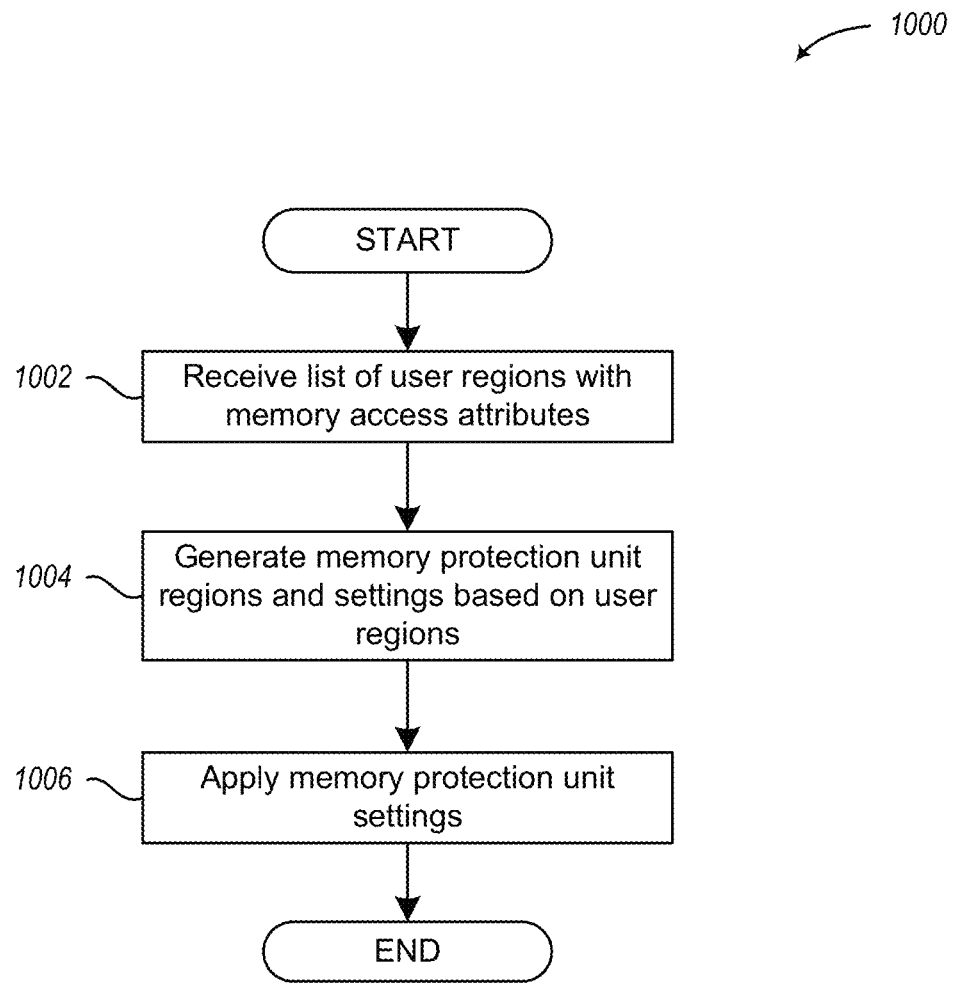
FIG. 10 shows a logical flow diagram of another process for configuring memory protection unit regions in accordance with embodiments described herein

FIG. 10 shows a logical flow diagram of another process 1000 for configuring memory protection unit regions in accordance with embodiments described herein. In various embodiments, process 1000 may be implemented by or executed on one or more computing devices, such as programmable computing device 108 in FIG. 1.

Process 1000 begins, after a start block, at block 1002, where a list of user regions is received. In various embodiments, the programmable computing device 108 receives the list of user regions from host computing device 120. For example, the host computing device 120 may present a graphical user interface to the user to enable the user to select one or more user-defined memory partitions, such as described in block 902 in FIG. 9. The host computing device 120 can then generate the list of user regions, such as described in block 904 in FIG. 9, and provide the list to the programmable computing device 108. In some embodiments, the list of user regions can take the form of a .h file, which can provide data that will end up with a data array in non-volatile memory.

Process 1000 proceeds to block 1004, where memory protection unit regions and their settings are generated based on the user regions. In various embodiments, process 1100 described in conjunction with FIGS. 11A-11D may be utilized to generate or otherwise define the memory protection unit regions.

Process 1000 continues at block 1006, where the memory protection unit settings are applied by the programmable computing device.

After block 1006, process 1000 terminates or otherwise returns to a calling process to perform other actions.

Figure 9:
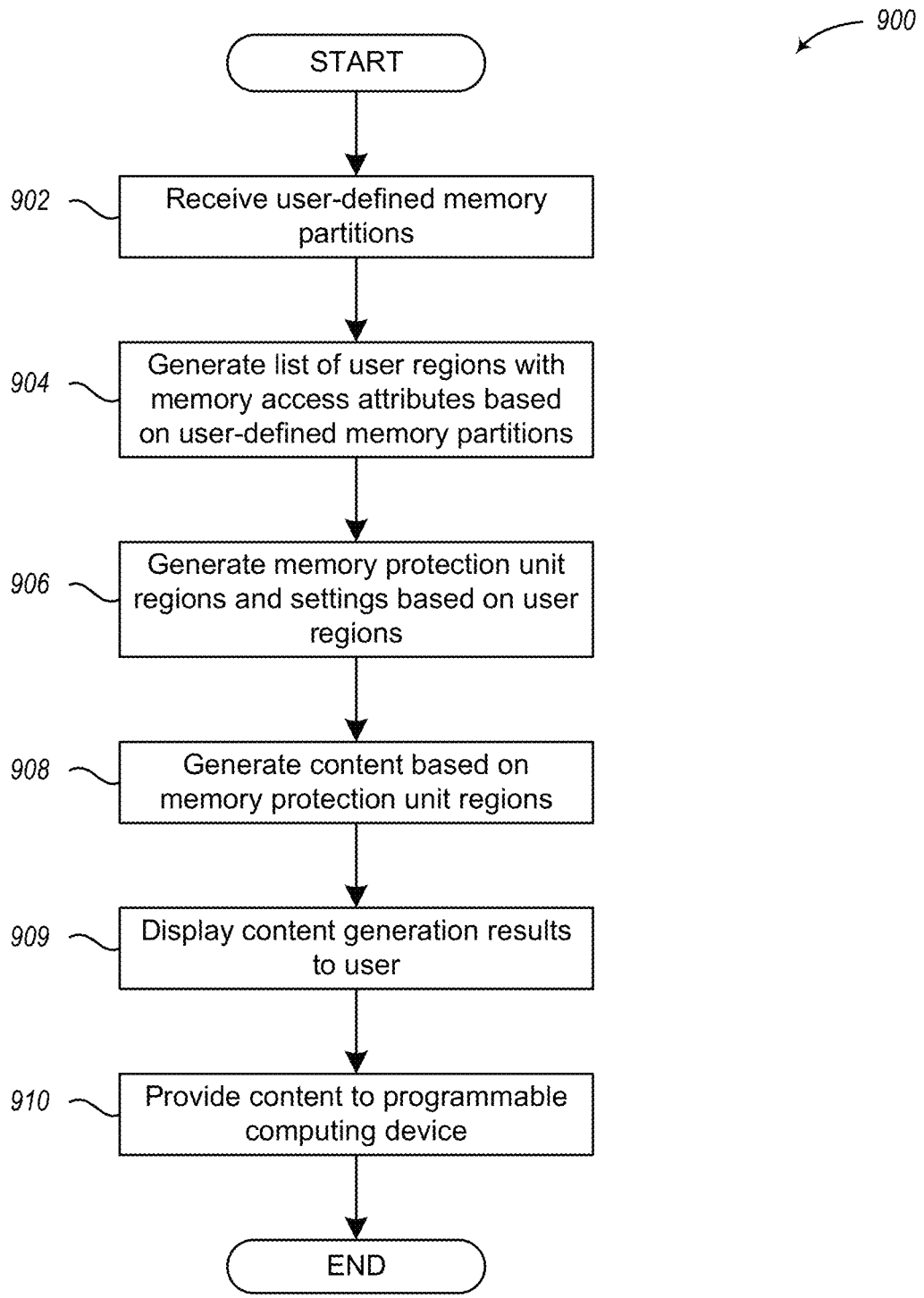
FIG. 9 shows a logical flow diagram of a process for generating content to configure memory protection unit regions in accordance with embodiments described herein.

FIGS. 11A-11D show a logical flow diagram of a process 1100 for generating memory protection unity regions in accordance with embodiments described herein. In embodiments where process 900 in FIG. 9 is performed by the host computing device 120, then process 1100 may be implemented by or executed on the host computing device 120. Comparatively, in embodiments where process 1000 in FIG. 10 is performed by the programmable computing device 108, then process 1100 may be implemented by or executed on the programmable computing device 108.

In general, process 1100 analyses different MPU region configurations by merging and splitting regions and iteratively processing those merged and split regions. These regions are then processed and analyzed to explore different possible strategies to cover the memory area of the programmable computing device. In this way, multiple MPU configuration possibilities are processed, such that the different results (e.g., splitting into sub-regions, utilizing several regions, or some combination thereof) can be compared to one another or compared to an expected memory coverage. The best coverage is then selected from the different results. This best coverage may be selected by the user, or it may be automatically selected based on user settings or preferences. For example, the user can set the best coverage based on closer mapping with uncovered area, closer mapping with extra covered area, or closer mapping with less regions. Or the user can request that a failure be reported if no exact mapping is found.

Various iterative parameters (e.g., iteration or process depth) can be selected or configured for process 1100 to account for a wide range of programmable computing devices (e.g., from Cortex-M0 to Cortex-M7). In various embodiments, process 1100 may include a debug step (not illustrated) to give the user the ability to easily retrieve the settings and configurations generated during processing. The user can then tune the iterative parameters to reach better results for different types of programmable computing devices.

Figure 11A:
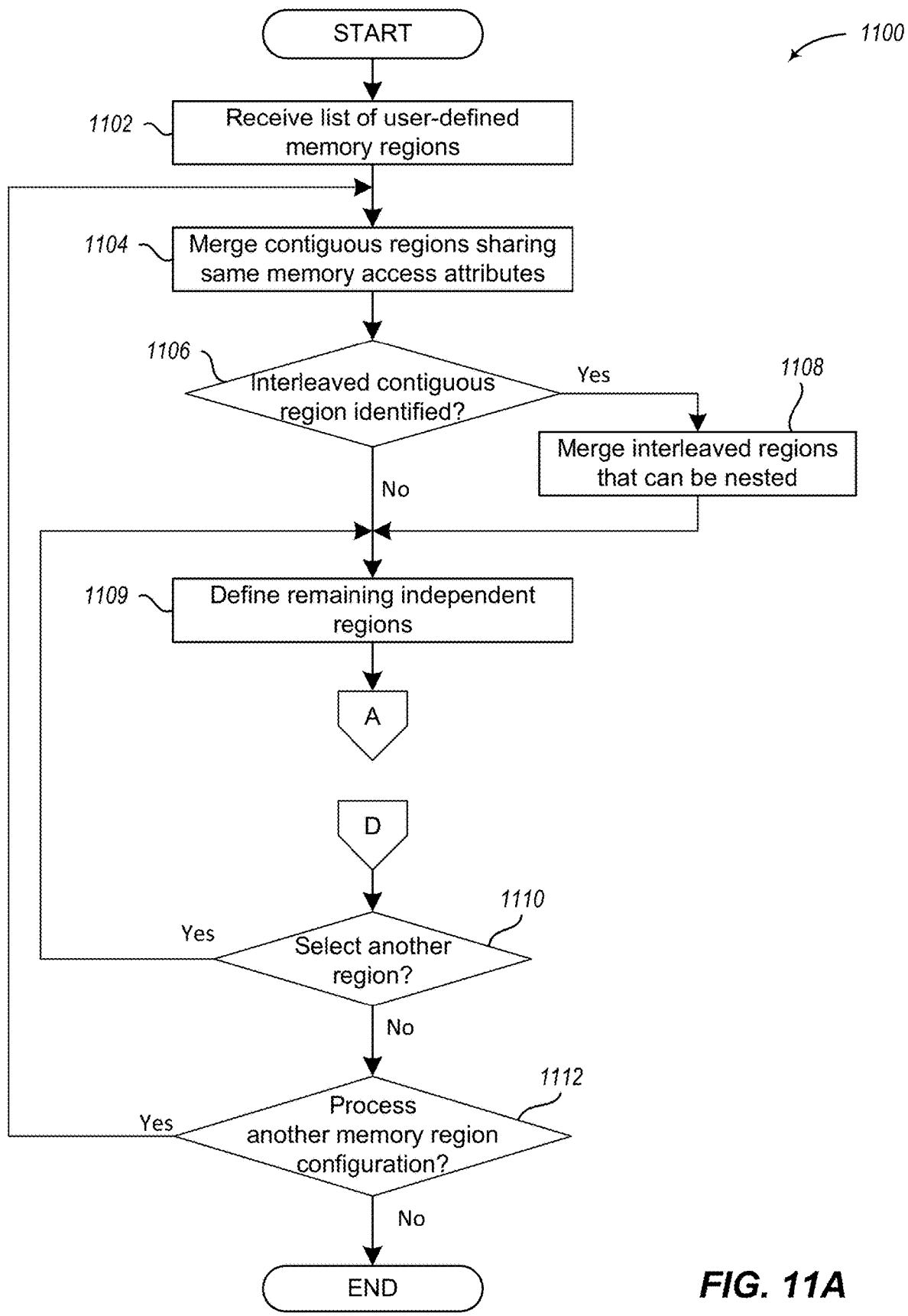
FIGS. 11A-11D show a logical flow diagram of a process for generating memory protection unity regions in accordance with embodiments described herein.

Process 1100 begins in FIG. 11A, after a start block, at block 1102, where the list of user-defined memory regions is received. In various embodiments, the list of user-defined memory regions is defined at block 904 in FIG. 9 or received at block 1002 in FIG. 10.

Process 1100 proceeds to block 1104, where contiguous user-defined regions are merged when those regions share same memory access attributes (e.g., read only, read-write, no-access, etc.). In various embodiments, the user-defined regions are compared two by two to identify contiguous memory regions that have the same memory access attributes. Contiguous memory regions are those regions that are not separated by other regions and belong to the same default memory map area (e.g., RAM or code or peripherals typically). When contiguous memory regions share the same memory access attributes, those regions are merged into a single region.

Process 1100 continues at decision block 1106, where a determination is made whether there are interleaved contiguous regions in the user-defined memory regions. If memory regions are separated by other regions that have different access attributes, then those regions are checked for interleaved regions that can be nested, such as read-only memory region within a read-write region. If interleaved contiguous regions can be nested, then process 1100 flows to block 1108, otherwise, process 1100 flows to block 1109.

At block 1108, the interleaved regions that can be nested are merged together with nesting attributes. In various embodiments, a region covering the interleaved contiguous regions are merged, where inner regions are defined with higher priorities to handle the nested regions.

Process 1100 proceeds next to block 1109, where remaining independent regions are defined.

Figure 11B:
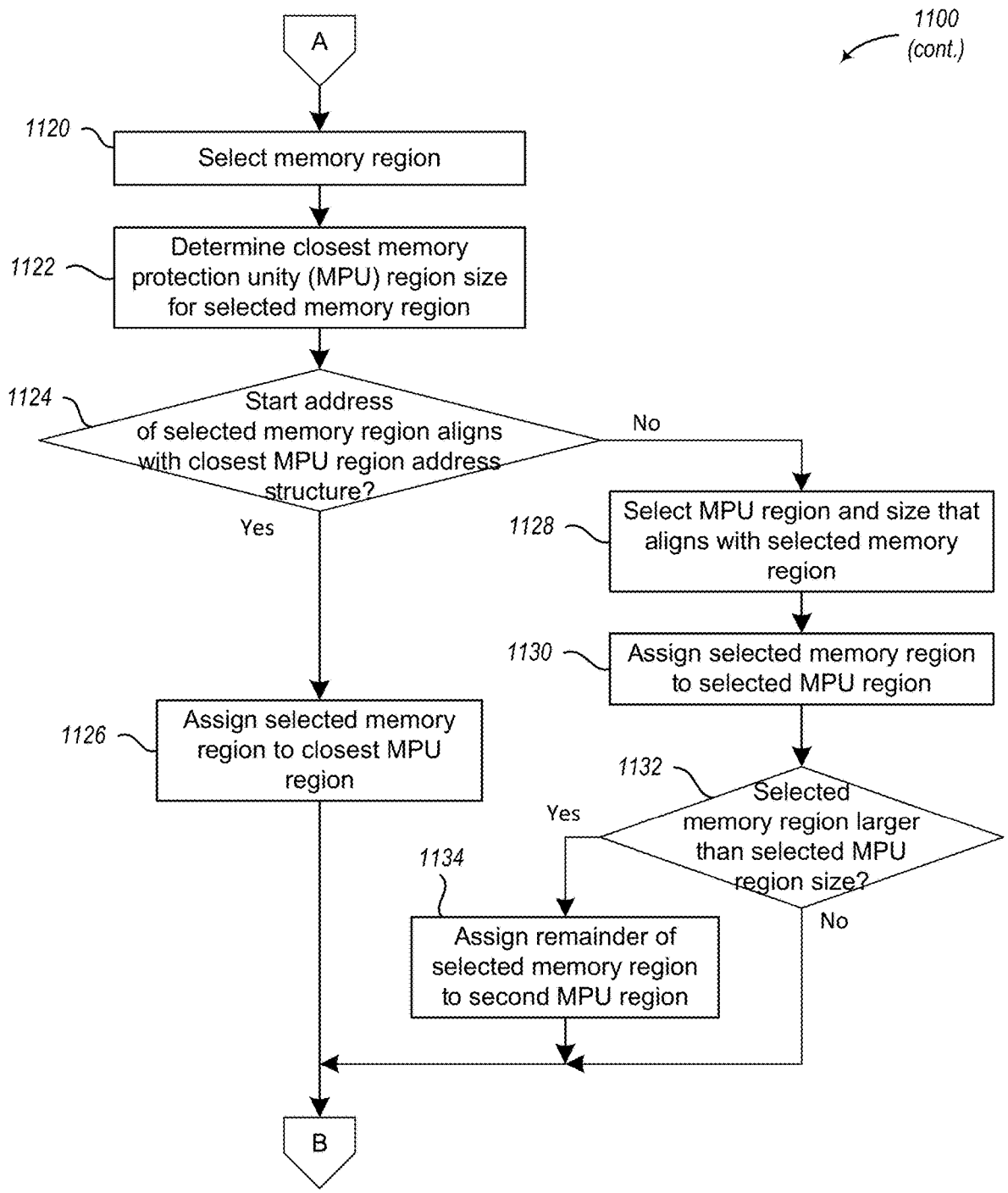

After block 1109, process 1100 proceeds to block 1120 in FIG. 11B.

At block 1120 in FIG. 11B, a memory region is selected from the merged, nested, and independent memory regions. In various embodiments, each memory region is selected and processed in a select order, such as by memory address, region size, etc. In general, processing each memory region separately allows for the splitting the analysis into N smaller analysis. For each of these N smaller analysis (i.e., processing each memory region), the same strategy, or different strategies, can be used based on user settings or user inputs.

Process 1100 proceeds next to block 1122, where a closest memory protection unit (MPU) region size is determined for the selected memory region. In various embodiments, a table of possible MPU region sizes is utilized to determine which MPU region size is the closest to the size of the selected memory region. For example, the table of MPU region sizes may indicate that the MPU region sizes range from 32 bytes to 4 gigabytes in 32 byte increments. In some embodiments, the table may also identify one or more sub-region sizes that can be utilized (e.g., a sub-region size may be equal to the region size divided by eight).

In some embodiments, the closest MPU region size is the MPU region size that is closest to the size of the selected memory region, but is larger than the size of the selected memory region. In other embodiments, the closest MPU region size is the MPU region size that is closest to the size of the selected memory region, but is smaller than the size of the selected memory region. In various embodiments, the user or an administrator may utilize a graphical user interface to select or define how the closest MPU region size is determined. In yet other embodiments, both strategies can be utilized to define the closest MPU region size, and their results can be ranked to select a preferred result.

Process 1100 continues next at decision block 1124, where a determination is made whether the start address of the selected memory region aligns with the address structure of the closest MPU region. The start address of the selected memory region aligns with the address structure of the closest MPU region if the start address is a multiple of the size of the MPU region. For example, if the closest MPU region is 256 KB in size, the start address of the selected memory region aligns with the address structure of the closest MPU region if the start address is a multiple of 256 KB. If the selected memory region start address aligns with the address structure of the closest MPU region, then process 1100 flows to block 1126; otherwise, process 1100 flows to block 1128.

At block 1126, the selected memory region is assigned to the closest MPU region. As used herein, assigning the selected memory region to an MPU region includes identifying or setting one or more settings or parameters that can be used by the programmable computing device to use or define an MPU region for the selected memory region.

If, at decision block 1124, the selected memory region start address does not align with the address structure of the closest MPU region, then process 1100 flows from decision block 1124 to block 1128. At block 1128, an MPU region and MPU region size are selected that aligns with the selected memory region. As indicated above, MPU region and size are selected such that the start address of the selected memory region is a multiple of the size of the MPU region.

Process 1100 proceeds to block 1130, where the selected memory region is assigned to the selected MPU region.

Process 1100 continues at decision block 1132, where a determination is made whether the selected memory region is larger than the MPU region size selected at block 1128. If the selected memory region is larger than the selected MPU region size, then process 1100 flows to block 1134; otherwise, process 1100 flows to decision block 1140 in FIG. 11C. In some embodiments, process 1100 may split and take both approaches in an iterative manner. In this way, the results of the different approaches can be compared. This iterative process may be optional and may be selected by a user or set by an administrator. In yet other embodiments, a list of different results may be presented to the user so that the user can select the preferred result.

At block 1134, the remainder of the selected memory region is assigned to a second MPU region. In some embodiments, the second MPU region is selected such that its size is the closest, larger MPU region size to the size of remainder portion. In yet other embodiments, the remainder itself can be iteratively processed using process 1100 with a given depth of split and search. In this way, the same flow, or a different flow, can be utilized to process this new region covering the remainder. In some embodiments, the depth of the split or iteration may refer to the number of times the remainder is subsequently processed. In other embodiments, the depth of the split or iteration may refer to the size of the remainder or size of a sub-region. This iterative process may be optional and may be selected by a user or set by an administrator. In yet other embodiments, a list of different results may be presented to the user so that the user can select the preferred result.

Figure 11C:
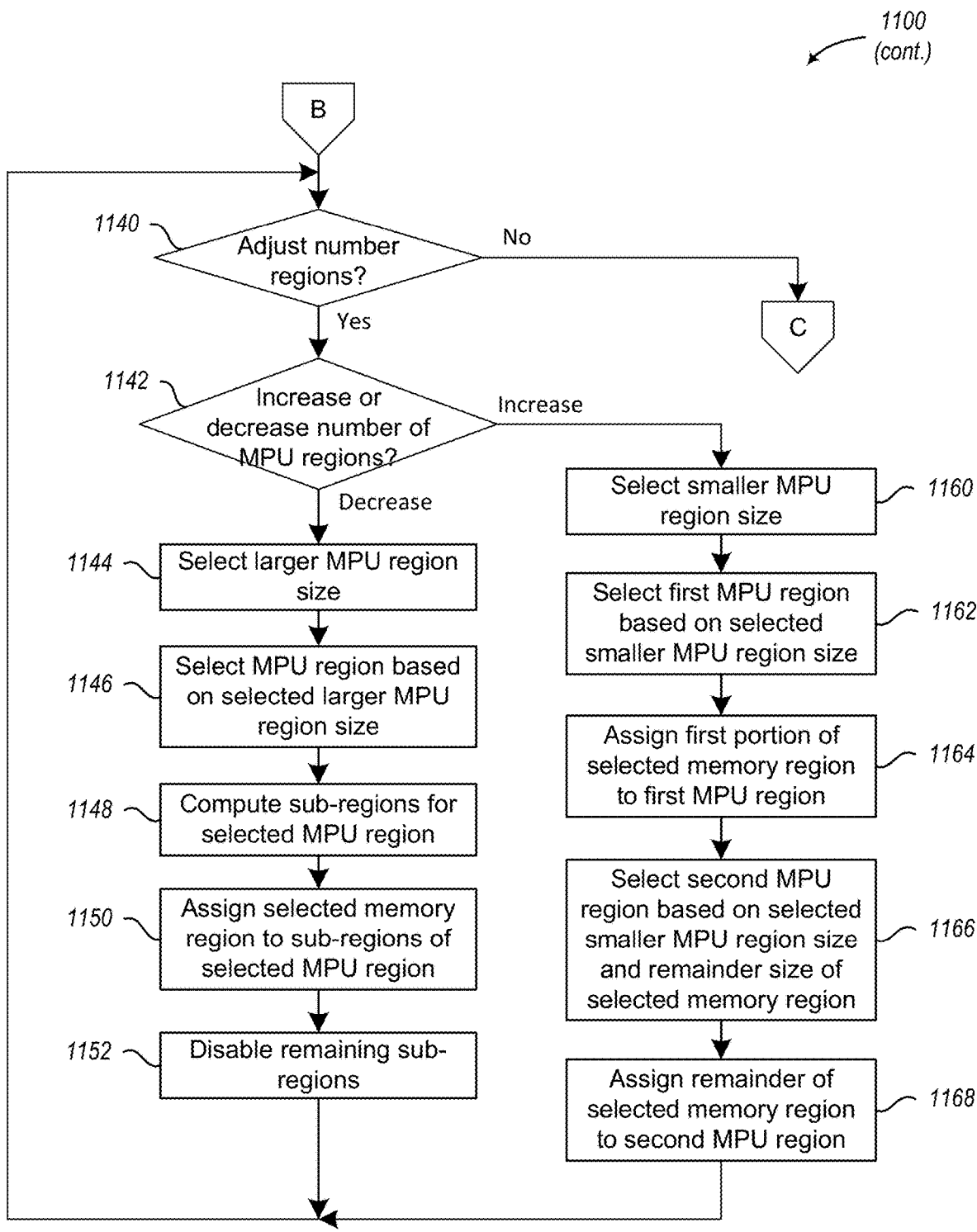

After block 1134 or after block 1126, process 1100 proceeds to decision block 1140 in FIG. 11C.

At decision block 1140 in FIG. 11C, a determination is made whether the number of regions is to be adjusted. In various embodiments, the user or an administrator can select whether more or fewer MPU regions is desirable to accommodate the various user-defined regions. In other embodiments, a plurality of different MPU region number or size configurations are analyzed, such that the different configurations can be ranked (e.g., as described below in conjunction with blocks 1170 and 1172 in FIG. 11D). In some embodiments, the type of programmable computing device may determine whether more or fewer MPU regions (or smaller or larger MPU regions) is desirable. For example, if the programmable computing device does not support sub-regions, then more MPU regions (or smaller MPU regions) may be desirable. If the number of regions is to be adjusted, then process 1100 flows to decision block 1142; otherwise, process 1100 flows to block 1170 in FIG. 11D.

At decision block 1142, a determination is made whether the number of MPU regions is increased or decreased. In various embodiments, different configurations of MPU region sizes or numbers are selected and processed. As discussed herein, different configurations of MPU region sizes or numbers may be processed and analyzed. In some embodiments, these iterations can be performed a user-selected number of times or until a user-selected criteria is met. For example, the user can select the memory range to cover and the possible start addresses and sizes of memory regions. Each memory configuration can be ranked based on user-selected preferences to identify a best configuration.

If the number of MPU regions is increased for a next MPU region configuration, process 1100 flows to block 1160; but if the number of MPU regions is decreased, process 1100 flows to block 1144.

At block 1144, a larger MPU region size is selected. In some embodiments, the larger selected MPU region size is larger than the closest MPU region size determined at block 1122 if the start address of the selected memory region aligns with the address structure of the closest MPU region. In other embodiments, the larger selected MPU region size is larger than the MPU region size selected at block 1128 if the start address of the selected memory region does not align with the address structure of the closest MPU region. In some other embodiments, the larger selected MPU region size may be larger than a previously selected larger MPU region size during a previous loop or iteration of process 1100.

Process 1100 proceed next to block 1146, where an MPU region is selected based on the larger MPU region size.

Process 1100 continues next at block 1148, where sub-regions are computed for the selected MPU region. In various embodiments, a table may indicate how many sub-regions are in the selected MPU region or can be used in the larger MPU region size.

Process 1100 proceeds to block 1150, where the selected memory region is assigned to one or more sub-regions of the selected MPU region. In various embodiments, the number of sub-regions used for the selected memory region is selected based on the size of the selected memory region such that the selected memory region is assigned to the sub-regions with no empty sub-regions.

Process 1100 continues at block 1152, where any remaining sub-regions in the selected MPU region are disabled. If the selected memory region is 40 kB, then a 64 kB MPU region may be selected at block 1146. Assuming there are eight sub-regions, each sub-region can hold 8 kB. Therefore, the selected memory region is assigned to five sub-regions at block 1150, and three sub-regions are disabled. In some embodiments, if a sub-region is larger than the remaining portion of the selected memory region, then the graphical user interface may notify the user that there is extra unused memory in a sub-region of the selected MPU region. After block 1152, process 1100 loops to decision block 1140 to determine if the number of regions is adjusted.

If, at decision block 1142, the number of MPU regions is increased, process 1100 flows from decision block 1142 to block 1160.

At block 1160, a smaller MPU region size is selected. In some embodiments, the smaller selected MPU region size is smaller than the closest MPU region size determined at block 1122 if the start address of the selected memory region aligns with the address structure of the closest MPU region. In other embodiments, the smaller selected MPU region size is smaller than the MPU region size selected at block 1128 if the start address of the selected memory region does not align with the address structure of the closest MPU region. In some other embodiments, the smaller selected MPU region size may be smaller than a previously selected smaller MPU region size during a previous loop or iteration of process 1100.

Process 1100 proceeds to block 1162, where a first MPU region is selected based on the selected smaller MPU region size.

Process 1100 continues at block 1164, where a first portion of the selected memory region is assigned to the first MPU region.

Process 1100 proceeds next to block 1166, where a second MPU region is selected based on the selected smaller MPU region size and a remainder size of the selected memory region. In some embodiments, the second MPU region may have the same smaller MPU region size as the first MPU region. In other embodiments, the second MPU region may be selected such that it has a size larger than, but closest to, the remainder size of the selected memory region.

Process 1100 continues at block 1168, where the remainder portion of the selected memory region is assigned to the second MPU region. In various embodiments, process 1100 may loop (not illustrated) to block 1160 to iterate with a solver approach and configured depth of search so that the remainder is further split. The results of each iteration may be ranked, so that a preferred result is selected. This iterative process may be optional and may be selected by a user or set by an administrator. In yet other embodiments, a list of different results may be presented to the user so that the user can select the preferred result.

After block 1168, process 1100 loops to decision block 1140 to determine if the number of regions is adjusted. Process 1100 may continue to loop or iterate through different MPU region size and MPU number configurations. If the number of regions is not adjusted and no additional MPU number and size configurations are processed, process 1100 flows from decision block 1140 to block 1170 in FIG. 11D.

Figure 11D:
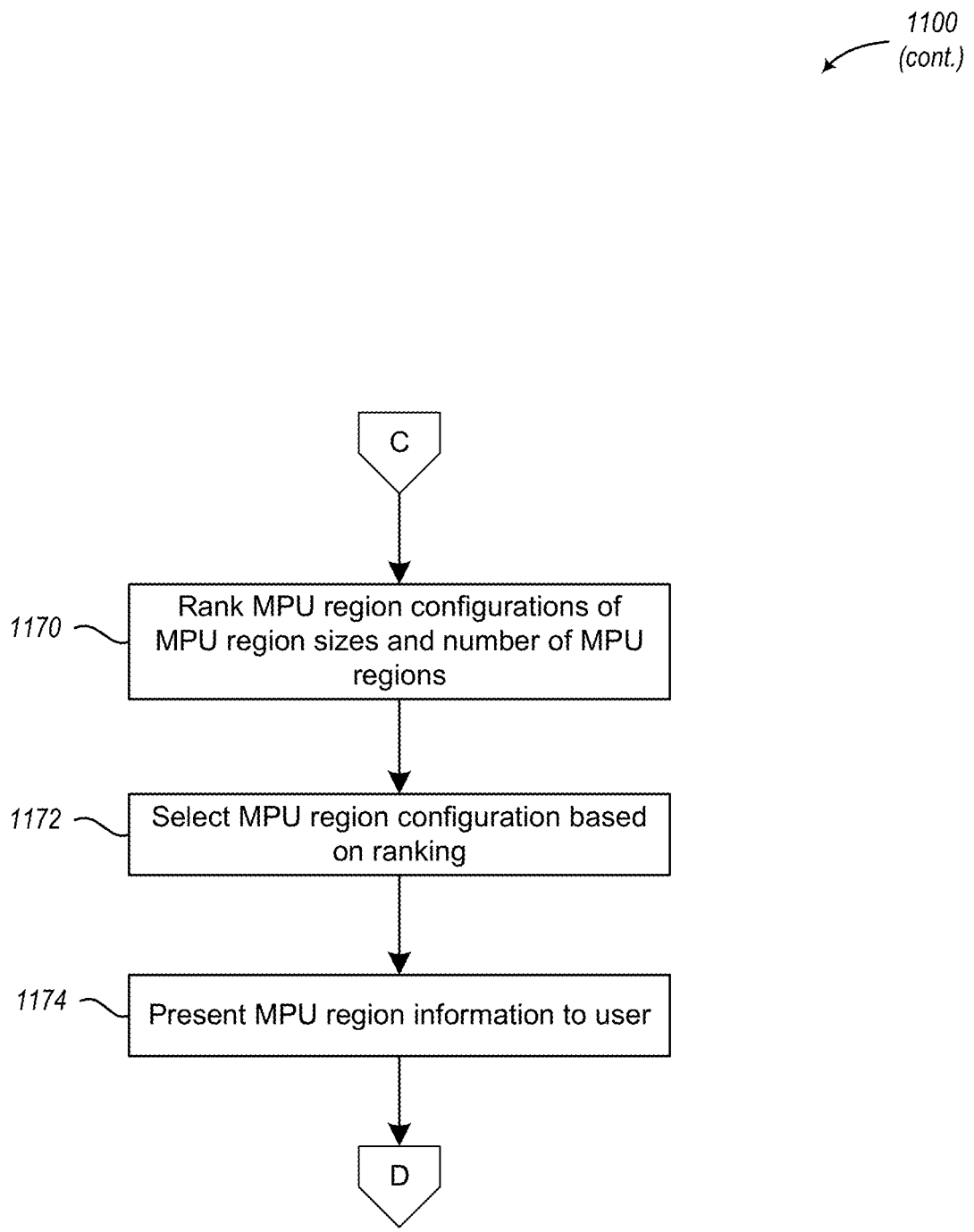

At block 1170 in FIG. 11D, the different configurations of MPU region number and sizes are ranked. In various embodiments, this ranking is based on a user or administrator selected preference. For example, in some situations a user can select to rank the MPU region configurations based on the number of MPU regions. In other situations, the user can select to rank the MPU region configurations based on a best fit approach independent of the number of MPU regions utilized. This best fit approach may rank MPU configurations based on the number of disabled sub-regions or the number of wasted bytes.

Process 1100 proceeds next to block 1172, where an MPU configuration is selected based on the ranking. In some embodiments, the MPU configuration that utilizes the fewest number of MPU regions is selected. In other embodiments, the MPU configuration that utilizes the fewest number of disabled sub-regions or the fewest number of wasted bytes is selected. This selection may be based on the user or administrator selected preferences.

In some embodiments, a list of possible results or solutions may be provided or displayed to the user. The user can then select the preferred results or preferred solution from the list. Process 1100 continues next at block 1174, where MPU region information is presented to the user. In various embodiments, this MPU region information can include the boundaries of the configured MPU regions, the boundaries of the user-defined regions, comparisons between the configured MPU boundaries and the user-defined regions, or other information. In some embodiments, a warning or message may be provided to the user when a misalignment is detected, such as a user-region boundary not matching the end of an MPU region (including sub-regions).

After block 1174, process 1100 proceeds to decision block 1110 in FIG. 11A.

At decision block 1110 in FIG. 11A, a determination is made whether another memory region is selected. If another memory region is selected, process 1100 loops to block 1120 in FIG. 11B to select another memory region; otherwise, process 1100 flows to decision block 1112.

At decision block 1112, a determination is made whether another memory region configuration is to be processed. In some embodiments, a user may select to have multiple different memory region configurations processed so that the user can select which configuration to use. In some embodiments, the results from a plurality of different memory configuration may be ranked based on one or more user-provided settings or preferences. And the memory configuration that meets or best fulfills those preferences may be selected. If another memory region configuration is to be processed, process 1100 looks to block 1104; otherwise, process 1100 terminates or otherwise returns to a calling process to perform more actions.

Figure 12:
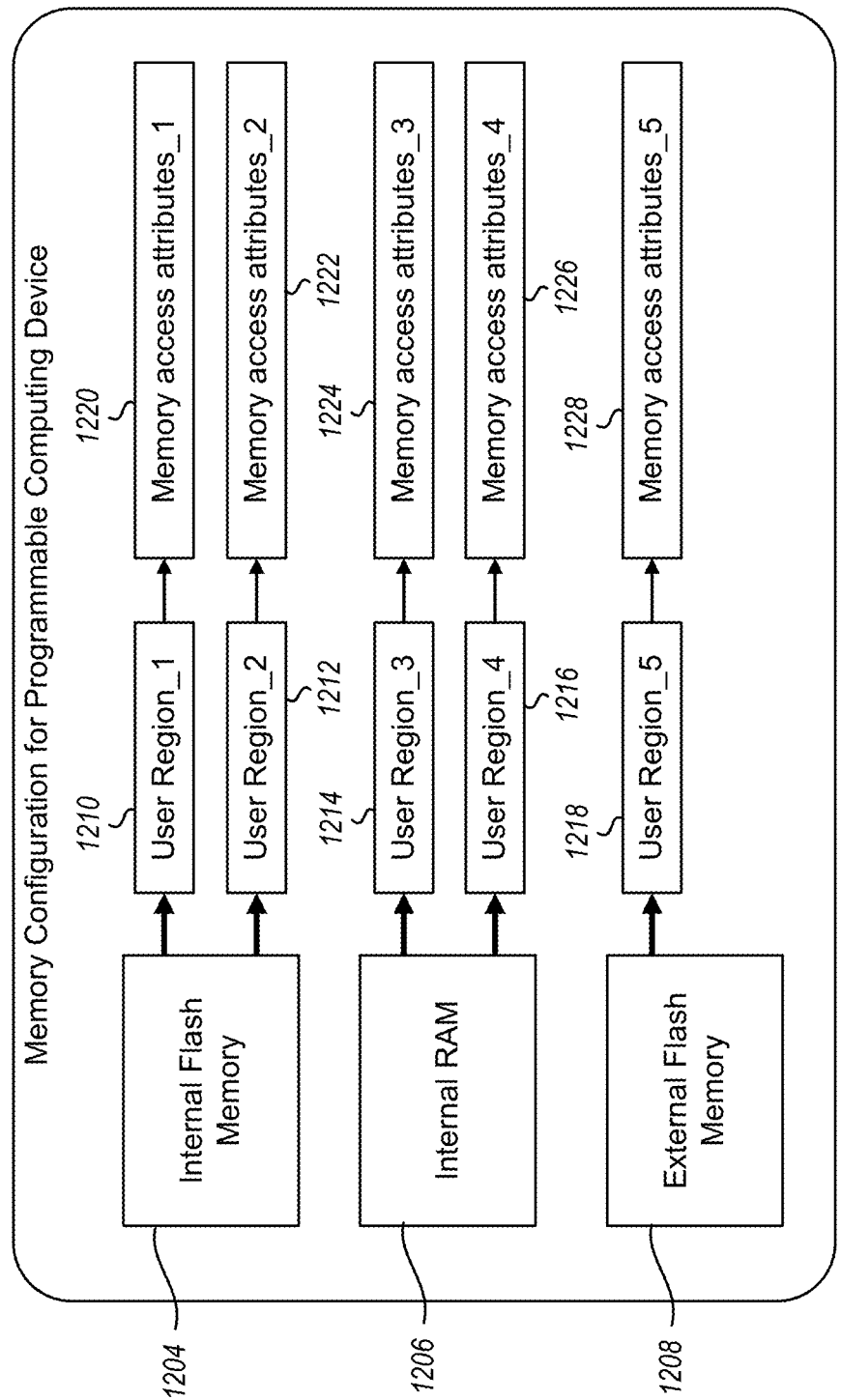
FIG. 12 is an illustrative example of a graphical user interface to enable a user to defined memory regions used to generate content in accordance with embodiments described herein.

FIG. 12 is an illustrative example of a graphical user interface 1200 to enable a user to defined memory regions used to generate content in accordance with embodiments described herein.

Graphical user interface 1200 may be displayed to a user after the user selects a project for a particular programmable computing device, as described herein. Graphical user interface 1200 displays the available memories 1204, 1206, and 1208 that are available to the user for the particular programmable computing device. In this example, the programmable computing device includes an internal flash memory 1204, an internal RAM 1206, and an external flash memory 1208.

The graphical user interface 1200 also enables the user to select one or more regions for one or more of the available regions. Although not illustrated, one or more dropdown menus or user input interfaces may be displayed to allow the user to select the user regions. In this example, the user has selected user region 1210 and user region 1212 for the internal flash memory 1204, user region 1214 and user region 1214 for the internal RAM 1206, and user region 1218 for the external flash memory 1208. Each user region may also have memory access attributes. For example, user region 1210 has memory access attributes 1220, user region 1212 has memory access attributes 1222, user region 1214 has memory access attributes 1224, user region 1216 has memory access attributes 1226, and user region 1218 has memory access attributes 1228. The memory access attributes can be selected by the user or defined by the system based on the type of memory, capabilities of the programmable computing device, etc.

The following is a summarization of the claims as filed.

A method may be summarized as including receiving a set of user-defined regions of a memory in which to store data on a programmable computing device; generating a list of regions with memory access attributes based on the user-defined regions; merging contiguous regions that share memory access attributes; determining if interleaved contiguous regions share at least one nested attribute; in response to determining that the interleaved contiguous regions share at least one nested attribute, defining a combined region for the interleaved continuous regions, including at least one priority region to handle nested regions in the combined region; in response to determining that contiguous regions fail to share memory access attributes or at least one nested attribute with at least one interleaved region, defining separate independent regions for the contiguous regions; and generating content to configure settings of a memory protection unit for the merged contiguous regions, the combined region, and the independent regions.

The method may include providing the content to the programmable computing device.

Generating the content may include generating initialization code that initializes the programmable computing device to store data based on the merged contiguous regions, the combined region, and the independent regions.

The method may include selecting a region from the contiguous regions, the combined region, and the independent regions; identifying a memory protection unit region size closest to a size of the selected region; determining if a start address of the selected region aligns with an address structure of the memory protection unit region size; and in response to the start address of the selected region aligning with the address structure of the memory protection unit region size, assigning the selected region to a memory protection unit region having the memory protection unit region size.

The method may include selecting a region from the contiguous regions, the combined region, and the independent regions; identifying a first memory protection unit region size closest to a size of the selected region; determining if a start address of the selected region aligns with an address structure of the first memory protection unit region size; and in response to the start address of the selected region not aligning with the address structure of the first memory protection unit region size, selecting a second memory protection unit size that aligns with the size of the selected region and assigning the selected region to a memory protection unit region having the second memory protection unit region size.

The method may include determining that the size of the selected region is larger than the memory protection unit region size; and assigning a remainder the selected region to a second memory protection unit region.

The method may include selecting a region from the contiguous regions, the combined region, and the independent regions; identifying a first memory protection unit region size closest to a size of the selected region; selecting a second memory protection unit region size that is larger than the first memory protection unit region size; selecting a memory protection unit region based on the second memory protection unit region size; identifying a plurality of sub-regions for the selected memory protection unit region; assigning the selected region to a first portion of the plurality of sub-regions; and disabling a second portion of the plurality of sub-regions.

The method may include selecting a region from the contiguous regions, the combined region, and the independent regions; identifying a first memory protection unit region size closest to a size of the selected region; selecting a second memory protection unit region size that is smaller than the first memory protection unit region size; selecting a first memory protection unit region based on the second memory protection unit region size; assigning a first portion of the selected region to the first memory protection unit region; selecting a second memory protection unit region based on a remainder size of the selected region; and assigning a second portion of the selected region to the second memory protection unit region.

The method may include ranking a plurality of memory protection unit region configurations; and selecting a memory protection unit region configuration from the plurality of memory protection unit region configurations based on the ranking.

A non-transitory computer-readable medium having contents that configure a microcontroller to perform a method, the method may be summarized as including receiving a set of user-defined regions of a memory in which to store data on a programmable computing device; generating a list of regions with memory access attributes based on the user-defined regions; merging contiguous regions that share memory access attributes; determining if interleaved contiguous regions share at least one nested attribute; in response to determining that the interleaved contiguous regions share at least one nested attribute, defining a combined region for the interleaved continuous regions, including at least one priority region to handle nested regions in the combined region; in response to determining that contiguous regions fail to share memory access attributes or at least one nested attribute with at least one interleaved region, defining separate independent regions for the contiguous regions; and generating content to configure settings of a memory protection unit for the merged contiguous regions, the combined region, and the independent regions.

The method performed by the microcontroller may include providing the content to the programmable computing device.

The method performed by the microcontroller may include selecting a region from the contiguous regions, the combined region, and the independent regions; identifying a memory protection unit region size closest to a size of the selected region; determining if a start address of the selected region aligns with an address structure of the memory protection unit region size; and in response to the start address of the selected region aligning with the address structure of the memory protection unit region size, assigning the selected region to a memory protection unit region having the memory protection unit region size.

The method performed by the microcontroller may include selecting a region from the contiguous regions, the combined region, and the independent regions; identifying a first memory protection unit region size closest to a size of the selected region; determining if a start address of the selected region aligns with an address structure of the first memory protection unit region size; and in response to the start address of the selected region not aligning with the address structure of the first memory protection unit region size, selecting a second memory protection unit size that aligns with the size of the selected region and assigning the selected region to a memory protection unit region having the second memory protection unit region size.

The method performed by the microcontroller may include determining that the size of the selected region is larger than the memory protection unit region size; and assigning a remainder the selected region to a second memory protection unit region.

The method performed by the microcontroller may include selecting a region from the contiguous regions, the combined region, and the independent regions; identifying a first memory protection unit region size closest to a size of the selected region; selecting a second memory protection unit region size that is larger than the first memory protection unit region size; selecting a memory protection unit region based on the second memory protection unit region size; identifying a plurality of sub-regions for the selected memory protection unit region; assigning the selected region to a first portion of the plurality of sub-regions; and disabling a second portion of the plurality of sub-regions.

The method performed by the microcontroller may include selecting a region from the contiguous regions, the combined region, and the independent regions; identifying a first memory protection unit region size closest to a size of the selected region; selecting a second memory protection unit region size that is smaller than the first memory protection unit region size; selecting a first memory protection unit region based on the second memory protection unit region size; assigning a first portion of the selected region to the first memory protection unit region; selecting a second memory protection unit region based on a remainder size of the selected region; and assigning a second portion of the selected region to the second memory protection unit region.

The method performed by the microcontroller may include ranking a plurality of memory protection unit region configurations; and selecting a memory protection unit region configuration from the plurality of memory protection unit region configurations based on the ranking.

A computing device may be summarized as including a memory, which, in operation, stores computer instructions; and at least one processor, which, in operation, executes the computer instructions to: receive a set of user-defined regions of a memory in which to store data on a programmable computing device; generate a list of regions with memory access attributes based on the user-defined regions; merge contiguous regions that share memory access attributes; determine if interleaved contiguous regions share at least one nested attribute; in response to determining that the interleaved contiguous regions share at least one nested attribute, define a combined region for the interleaved continuous regions, including at least one priority region to handle nested regions in the combined region; in response to determining that contiguous regions fail to share memory access attributes or at least one nested attribute with at least one interleaved region, define separate independent regions for the contiguous regions; and generate content to configure settings of a memory protection unit for the merged contiguous regions, the combined region, and the independent regions.

The at least one processor, which, in operation, may execute the computer instructions to select a region from the contiguous regions, the combined region, and the independent regions; identify a memory protection unit region size closest to a size of the selected region; determine if a start address of the selected region aligns with an address structure of the memory protection unit region size; and in response to the start address of the selected region aligning with the address structure of the memory protection unit region size, assign the selected region to a memory protection unit region having the memory protection unit region size.

The at least one processor, which, in operation, may execute the computer instructions to select a region from the contiguous regions, the combined region, and the independent regions; identify a first memory protection unit region size closest to a size of the selected region; determine if a start address of the selected region aligns with an address structure of the first memory protection unit region size; and in response to the start address of the selected region not aligning with the address structure of the first memory protection unit region size, select a second memory protection unit size that aligns with the size of the selected region and assign the selected region to a memory protection unit region having the second memory protection unit region size.

The at least one processor, which, in operation, may execute the computer instructions to select a region from the contiguous regions, the combined region, and the independent regions; identify a first memory protection unit region size closest to a size of the selected region; select a second memory protection unit region size that is larger than the first memory protection unit region size; select a memory protection unit region based on the second memory protection unit region size; identify a plurality of sub-regions for the selected memory protection unit region; assign the selected region to a first portion of the plurality of sub-regions; and disable a second portion of the plurality of sub-regions.

The at least one processor, which, in operation, may execute the computer instructions to select a region from the contiguous regions, the combined region, and the independent regions; identify a first memory protection unit region size closest to a size of the selected region; select a second memory protection unit region size that is smaller than the first memory protection unit region size; select a first memory protection unit region based on the second memory protection unit region size; assign a first portion of the selected region to the first memory protection unit region; select a second memory protection unit region based on a remainder size of the selected region; and assign a second portion of the selected region to the second memory protection unit region.

The at least one processor, which, in operation, may execute the computer instructions to rank a plurality of memory protection unit region configurations; and select a memory protection unit region configuration from the plurality of memory protection unit region configurations based on the ranking.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    receiving a set of user-defined regions of a memory in which to store data on a programmable computing device;
    generating a list of regions with memory access attributes based on the user-defined regions;
    merging contiguous regions that share memory access attributes;
    determining if interleaved contiguous regions share at least one nested attribute;
    in response to determining that the interleaved contiguous regions share at least one nested attribute, defining a combined region for the interleaved contiguous regions, including at least one priority region to handle nested regions in the combined region;
    in response to determining that contiguous regions fail to share memory access attributes or at least one nested attribute with at least one interleaved region, defining separate independent regions for the contiguous regions; and
    generating content to configure settings of a memory protection unit for the merged contiguous regions, the combined region, and the independent regions.

2. The method of claim 1, comprising:
    providing the content to the programmable computing device.

3. The method of claim 1, wherein generating the content comprises:
    generating initialization code that initializes the programmable computing device to store data based on the merged contiguous regions, the combined region, and the independent regions.

4. The method of claim 1, comprising:
    selecting a region from the contiguous regions, the combined region, and the independent regions;
    identifying a memory protection unit region size closest to a size of the selected region;
    determining if a start address of the selected region aligns with an address structure of the memory protection unit region size; and
    in response to the start address of the selected region aligning with the address structure of the memory protection unit region size, assigning the selected region to a memory protection unit region having the memory protection unit region size.

5. The method of claim 1, comprising:
    selecting a region from the contiguous regions, the combined region, and the independent regions;
    identifying a first memory protection unit region size closest to a size of the selected region;
    determining if a start address of the selected region aligns with an address structure of the first memory protection unit region size; and
    in response to the start address of the selected region not aligning with the address structure of the first memory protection unit region size, selecting a second memory protection unit region size that aligns with the size of the selected region and assigning the selected region to a memory protection unit region having the second memory protection unit region size.

6. The method of claim 5, comprising:
    determining that the size of the selected region is larger than the memory protection unit region size; and
    assigning a remainder the selected region to a second memory protection unit region.

7. The method of claim 1, comprising:
    selecting a region from the contiguous regions, the combined region, and the independent regions;
    identifying a first memory protection unit region size closest to a size of the selected region;
    selecting a second memory protection unit region size that is larger than the first memory protection unit region size;
    selecting a memory protection unit region based on the second memory protection unit region size;
    identifying a plurality of sub-regions for the selected memory protection unit region;
    assigning the selected region to a first portion of the plurality of sub-regions; and
    disabling a second portion of the plurality of sub-regions.

8. The method of claim 1, comprising:
  selecting a region from the contiguous regions, the combined region, and the independent regions;
  identifying a first memory protection unit region size closest to a size of the selected region;
  selecting a second memory protection unit region size that is smaller than the first memory protection unit region size;
  selecting a first memory protection unit region based on the second memory protection unit region size;
  assigning a first portion of the selected region to the first memory protection unit region;
  selecting a second memory protection unit region based on a remainder size of the selected region; and
  assigning a second portion of the selected region to the second memory protection unit region.

9. The method of claim 1, comprising:
  ranking a plurality of memory protection unit region configurations; and
  selecting a memory protection unit region configuration from the plurality of memory protection unit region configurations based on the ranking.

10. A non-transitory computer-readable medium having contents that configure a microcontroller to perform a method, the method comprising:
  receiving a set of user-defined regions of a memory in which to store data on a programmable computing device;
  generating a list of regions with memory access attributes based on the user-defined regions;
  merging contiguous regions that share memory access attributes;
  determining if interleaved contiguous regions share at least one nested attribute;
  in response to determining that the interleaved contiguous regions share at least one nested attribute, defining a combined region for the interleaved contiguous regions, including at least one priority region to handle nested regions in the combined region;
  in response to determining that contiguous regions fail to share memory access attributes or at least one nested attribute with at least one interleaved region, defining separate independent regions for the contiguous regions; and
  generating content to configure settings of a memory protection unit for the merged contiguous regions, the combined region, and the independent regions.

11. The non-transitory computer-readable medium of claim 10, wherein the method comprises:
  providing the content to the programmable computing device.

12. The non-transitory computer-readable medium of claim 10, wherein the method comprises:
  selecting a region from the contiguous regions, the combined region, and the independent regions;
  identifying a memory protection unit region size closest to a size of the selected region;
  determining if a start address of the selected region aligns with an address structure of the memory protection unit region size; and
  in response to the start address of the selected region aligning with the address structure of the memory protection unit region size, assigning the selected region to a memory protection unit region having the memory protection unit region size.

13. The non-transitory computer-readable medium of claim 10, wherein the method comprises:
  selecting a region from the contiguous regions, the combined region, and the independent regions;
  identifying a first memory protection unit region size closest to a size of the selected region;
  determining if a start address of the selected region aligns with an address structure of the first memory protection unit region size; and
  in response to the start address of the selected region not aligning with the address structure of the first memory protection unit region size, selecting a second memory protection unit region size that aligns with the size of the selected region and assigning the selected region to a memory protection unit region having the second memory protection unit region size.

14. The non-transitory computer-readable medium of claim 13, wherein the method comprises:
  determining that the size of the selected region is larger than the memory protection unit region size; and
  assigning a remainder the selected region to a second memory protection unit region.

15. The non-transitory computer-readable medium of claim 10, wherein the method comprises:
  selecting a region from the contiguous regions, the combined region, and the independent regions;
  identifying a first memory protection unit region size closest to a size of the selected region;
  selecting a second memory protection unit region size that is larger than the first memory protection unit region size;
  selecting a memory protection unit region based on the second memory protection unit region size;
  identifying a plurality of sub-regions for the selected memory protection unit region;
  assigning the selected region to a first portion of the plurality of sub-regions; and
  disabling a second portion of the plurality of sub-regions.

16. The non-transitory computer-readable medium of claim 10, wherein the method comprises:
  selecting a region from the contiguous regions, the combined region, and the independent regions;
  identifying a first memory protection unit region size closest to a size of the selected region;
  selecting a second memory protection unit region size that is smaller than the first memory protection unit region size;
  selecting a first memory protection unit region based on the second memory protection unit region size;
  assigning a first portion of the selected region to the first memory protection unit region;
  selecting a second memory protection unit region based on a remainder size of the selected region; and
  assigning a second portion of the selected region to the second memory protection unit region.

17. The non-transitory computer-readable medium of claim 10, wherein the method comprises:
  ranking a plurality of memory protection unit region configurations; and
  selecting a memory protection unit region configuration from the plurality of memory protection unit region configurations based on the ranking.

18. A computing device, comprising:
  a memory, which, in operation, stores computer instructions; and
  at least one processor, which, in operation, executes the computer instructions to:

receive set of user-defined regions of a memory in which to store data on a programmable computing device;

generate a list of regions with memory access attributes based on the user-defined regions;

merge contiguous regions that share memory access attributes;

determine if interleaved contiguous regions share at least one nested attribute;

in response to determining that the interleaved contiguous regions share at least one nested attribute, define a combined region for the interleaved contiguous regions, including at least one priority region to handle nested regions in the combined region;

in response to determining that contiguous regions fail to share memory access attributes or at least one nested attribute with at least one interleaved region, define separate independent regions for the contiguous regions; and generate content to configure settings of a memory protection unit for the merged contiguous regions, the combined region, and the independent regions.

19. The computing device of claim 18, wherein the at least one processor, which, in operation, executes the computer instructions to:

select a region from the contiguous regions, the combined region, and the independent regions;

identify a memory protection unit region size closest to a size of the selected region;

determine if a start address of the selected region aligns with an address structure of the memory protection unit region size; and in response to the start address of the selected region aligning with the address structure of the memory protection unit region size, assign the selected region to a memory protection unit region having the memory protection unit region size.

20. The computing device of claim 18, wherein the at least one processor, which, in operation, executes the computer instructions to:

select a region from the contiguous regions, the combined region, and the independent regions;

identify a first memory protection unit region size closest to a size of the selected region;

determine if a start address of the selected region aligns with an address structure of the first memory protection unit region size; and in response to the start address of the selected region not aligning with the address structure of the first memory protection unit region size, select a second memory protection unit region size that aligns with the size of the selected region and assign the selected region to a memory protection unit region having the second memory protection unit region size.

21. The computing device of claim 18, wherein the at least one processor, which, in operation, executes the computer instructions to:

select a region from the contiguous regions, the combined region, and the independent regions;

identify a first memory protection unit region size closest to a size of the selected region;

select a second memory protection unit region size that is larger than the first memory protection unit region size;

select a memory protection unit region based on the second memory protection unit region size;

identify a plurality of sub-regions for the selected memory protection unit region;

assign the selected region to a first portion of the plurality of sub-regions; and disable a second portion of the plurality of sub-regions.

22. The computing device of claim 18, wherein the at least one processor, which, in operation, executes the computer instructions to:

select a region from the contiguous regions, the combined region, and the independent regions;

identify a first memory protection unit region size closest to a size of the selected region;

select a second memory protection unit region size that is smaller than the first memory protection unit region size;

select a first memory protection unit region based on the second memory protection unit region size;

assign a first portion of the selected region to the first memory protection unit region;

select a second memory protection unit region based on a remainder size of the selected region; and assign a second portion of the selected region to the second memory protection unit region.

23. The computing device of claim 18, wherein the at least one processor, which, in operation, executes the computer instructions to:

rank a plurality of memory protection unit region configurations; and select a memory protection unit region configuration from the plurality of memory protection unit region configurations based on the ranking.

* * * * *

UNITED STATES PATENT AND TRADEMARK OFFICE
CERTIFICATE OF CORRECTION

PATENT NO. : 11,928,339 B2
APPLICATION NO. : 17/825975
DATED : March 12, 2024
INVENTOR(S) : Frederic Ruelle et al.

Page 1 of 1

It is certified that error appears in the above-identified patent and that said Letters Patent is hereby corrected as shown below:

On the Title Page

Item (73) Assignee:
"(73) Assignee: STMicroelectronics (Grand Quest), SAS, Le Mans (FR)"
Should read:
--(73) Assignee: STMicroelectronics (Grand Ouest), SAS, Le Mans (FR)--.

Signed and Sealed this
Seventh Day of May, 2024

Katherine Kelly Vidal
*Director of the United States Patent and Trademark Office*